US012770753B2

(12) United States Patent
Pelletier et al.

(10) Patent No.: US 12,770,753 B2
(45) Date of Patent: Oct. 20, 2026

(54) TERMINALLY STERILIZED ALPHA-EMITTING ISOTOPE GENERATOR AND METHOD FOR PRODUCING TERMINALLY STERILIZED ALPHA-EMITTING ISOTOPE

(71) Applicant: TAG1 Inc., Downingtown, PA (US)

(72) Inventors: Émilie Pelletier, Saint-Lambert (CA); Greg Bushman, Saint Louis, MO (US); Sumit Verma, Chesterfield, MO (US); Ian Akoro, Offalon, IL (US)

(73) Assignee: TAG1 Inc., St Louis (MO)

( * ) Notice: Subject to any disclaimer, the term of this patent is extended or adjusted under 35 U.S.C. 154(b) by 393 days.

(21) Appl. No.: 18/520,783

(22) Filed: Nov. 28, 2023

(65) Prior Publication Data

US 2024/0177880 A1 May 30, 2024

Related U.S. Application Data

(60) Provisional application No. 63/428,185, filed on Nov. 28, 2022.

(51) Int. Cl.

| | |
|---|---|
| ***G21G 4/08*** | (2006.01) |
| ***G21G 1/00*** | (2006.01) |
| ***G21H 5/02*** | (2006.01) |

(52) U.S. Cl.

CPC ............. *G21G 4/08* (2013.01); *G21G 1/0005* (2013.01); *G21G 1/001* (2013.01); *G21H 5/02* (2013.01); *G21G 2001/0094* (2013.01)

(58) Field of Classification Search

CPC ........ G21G 4/08; G21G 1/0005; G21G 1/001; G21G 2001/0094; G21G 1/04;

(Continued)

(56) References Cited

U.S. PATENT DOCUMENTS 5,038,046 A * 8/1991 Norman .................. G21G 4/08 423/2
6,126,909 A * 10/2000 Rotmensch ............ G21G 1/001 423/2

(Continued)

FOREIGN PATENT DOCUMENTS

CA 3021876 A1 11/2017
CN 1658938 A * 8/2005 ............... G21G 4/08

OTHER PUBLICATIONS

Boldyrev, P.P., Bortash, A.I., Zagryadskil, V.A. et al. 212Pb/212Bi Generator for nuclear medicine. At Energy 111, 422-427 (2012). https://doi.org/10.1007/s10512-012-9513-x (Year: 2012).*

(Continued)

*Primary Examiner* — Michael J Logie
*Assistant Examiner* — Christopher J Gassen
(74) *Attorney, Agent, or Firm* — STINSON LLP

(57) ABSTRACT

A terminally sterilized isotope generator for producing an alpha-emitting Lead-212 ($^{212}Pb$) daughter isotope by emanation of Radon-220 ($^{220}Rn$) gas from Radium-224, comprising a closed retainer assembly including a parent-isotope chamber for receiving a parent isotope, a daughter-isotope chamber for collecting the $^{212}Pb$ daughter isotope, and a gas permeable membrane separating the parent-isotope chamber from the daughter-isotope chamber, wherein the parent isotope is naturally decaying into $^{220}Rn$ within the parent-isotope chamber, wherein the gas permeable membrane allows the $^{220}Rn$ to passively pass therethrough, wherein the $^{220}Rn$ is spontaneously decaying into $^{212}Pb$ within the daughter-isotope chamber. An eluent is delivered in the daughter-isotope chamber, to elute in a liquid form the $^{212}Pb$ generated in a gaseous form; and a collection container collects the $^{212}Pb$ daughter-isotope eluted. The isotope generator is scalable based on required $^{212}Pb$ daughter-isotope (Continued)

quantities to be generated, the $^{212}Pb$ daughter-isotope quantities ranging from 1 mCi to 500 mCi.

23 Claims, 8 Drawing Sheets

(58) Field of Classification Search
CPC .... G21G 2001/0084; G21G 4/10; G21H 5/02; A61K 2121/00; A61K 51/1282; A61K 51/1289; A61K 51/00; A61N 5/1001; C01F 13/00; C01B 23/0073; C01G 21/00; G21F 5/015; G21F 5/018; G21F 5/12; B01J 20/06; B01J 20/20; B01J 20/34; B01J 39/04; B01D 15/10; B01D 15/265; B01D 15/362; B01F 2101/57
See application file for complete search history.

(56) References Cited

U.S. PATENT DOCUMENTS

| | | | | |
|---|---|---|---|---|
| 9,029,799 | B2 | 5/2015 | Horton | |
| 10,020,086 | B2 | 7/2018 | Torgue | |
| 11,037,690 | B2 | 6/2021 | Torgue | |
| 11,348,702 | B2 | 5/2022 | O'Hara | |
| 11,383,204 | B1 | 7/2022 | Abbasi | |
| 12,125,603 | B2 | 10/2024 | Larson | |
| 2003/0127395 | A1* | 7/2003 | Bond | B01J 39/04 423/11 |
| 2017/0319724 | A1* | 11/2017 | Speth | G21G 4/08 |
| 2018/0047474 | A1* | 2/2018 | O'Hara | C01B 23/0073 |
| 2021/0188654 | A1* | 6/2021 | O'Hara | B01J 20/20 |
| 2022/0301737 | A1 | 9/2022 | O'Hara | |
| 2024/0327948 | A1 | 10/2024 | Delpassand et al. | |
| 2024/0339237 | A1* | 10/2024 | Kelly | C04B 41/5045 |
| 2024/0424154 | A1 | 12/2024 | Kelly | |
| 2025/0367574 | A1 | 12/2025 | Delpassand et al. | |
| 2025/0368525 | A1 | 12/2025 | Sagastume | |

OTHER PUBLICATIONS

W. Wrasidlo, K.J. Mysels / Colloids and Surfaces A: Physicochem. Eng. Aspects 186 (2001) 123-128. https://doi.org/10.1016/S0927-7757(00)00768-8 (Year: 2001).*

P P Boldyrev et al 2018 J. Phys.: Conf. Ser. 1099 012003. doi :10.1088/1742-6596/1099/1/012003 (Year: 2018).*

S. Hassfjell / Applied Radiation and Isotopes 55 (2001) 433-439. https://doi.org/10.1016/S0969-8043(00)00372-9 (Year: 2001).*

Ruth Gong Li, Vilde Yuli Stenberg, Roy Hartvig Larsen An Experimental Generator for Production of High-Purity 212Pb for Use in Radiopharmaceuticals Journal of Nuclear Medicine Jan. 2023, 64 (1) 173-176; DOI: https://doi.org/10.2967/jnumed.122.264009.

* cited by examiner

TERMINALLY STERILIZED ALPHA-EMITTING ISOTOPE GENERATOR AND METHOD FOR PRODUCING TERMINALLY STERILIZED ALPHA-EMITTING ISOTOPE

CROSS-REFERENCE TO RELATED APPLICATIONS

This application claims priority under 35USC § 119 (e) of U.S. provisional patent application 63/428,185 filed on Nov. 28, 2022, the specification of which is hereby incorporated by reference.

TECHNICAL FIELD

The present disclosure relates to daughter-isotope generators for nuclear medicine. More particularly, the present disclosure relates to a system and method to generate high purity Lead-212 ($^{212}$Pb) isotope.

BACKGROUND

Existing generators for producing Lead-212 ($^{212}$Pb) isotopes are column-based generators that employ source isotopes such as Thorium-228 ($^{228}$Th) and/or Radium-224 ($^{224}$Ra) that are adsorbed onto a cation exchange resin in an exchange column from which the $^{212}$Pb and/or Bismuth-212 ($^{212}$Bi) isotopes are recovered from the resin. However, while generators that employ a $^{228}$Th source isotope can provide a long-term supply of $^{212}$Pb and $^{212}$Bi isotopes, these generators have well known problems.

$^{228}$Th generators are high-activity generators that can cause radiolytic failure in the generator columns over time and may release high energy contaminates into the $^{212}$Pb and/or $^{212}$Bi solutions recovered from these columns. Contaminants in the recovered $^{212}$Pb and/or $^{212}$Bi solutions have the potential to create deleterious radiation doses.

Existing $^{228}$Th generators also experience characteristic decreases in radon yields over time due to radiolytic breakdown of organic capture materials, such as barium stearate used to contain the isotope sources. Severe contamination can also result if a breach in the generator column takes place due to prolonged radiolysis by the high energy source isotopes.

Exchange resins used in these generators are also prone to radiolytic breakdown that can result in breakthrough of $^{224}$Ra isotopes from the generator column that contaminate solutions containing the recovered $^{212}$Pb and/or $^{212}$Bi isotopes. This can also result in unnecessary or unacceptable radiation doses for the patient, especially due to high gammas from Thallium-208 ($^{208}$Tl).

These generators may also have low $^{212}$Pb and/or $^{212}$Bi yields due to gaseous diffusion of the intermediate noble gas $^{220}$Rn deep into the exchange resin beads.

There is therefore a need for an improved isotope generator for producing $^{212}$Pb daughter isotope and make it accessible to the radio-pharmacies who currently utilize nuclear isotope generators for multitude of diagnostic and a few therapeutic applications.

SUMMARY

In accordance with an embodiment, there is provided a terminally sterilized isotope generator for producing an alpha-emitting Lead-212 ($^{212}$Pb) daughter isotope by emanation of Radon-220 ($^{220}$Rn) gas from Radium-224 ($^{224}$Ra), the isotope generator comprising a closed retainer assembly including a parent-isotope chamber for receiving a parent isotope, a daughter-isotope chamber for collecting the $^{212}$Pb daughter isotope, and a gas permeable membrane separating the parent-isotope chamber from the daughter-isotope chamber, wherein the parent isotope is naturally decaying into 220Rn within the parent-isotope chamber, and wherein the gas permeable membrane allows the $^{220}$Rn to passively pass therethrough under the action of gravity or diffusion, wherein the $^{220}$Rn is spontaneously decaying into $^{212}$Pb within the daughter-isotope chamber; a load port opening in the parent-isotope chamber, an inlet port and an outlet port, spaced apart from each other, and both opening in the daughter-isotope chamber, a parent-isotope dispenser, in fluid communication with the load port, configured to deliver the parent isotope into the parent-isotope chamber; an eluent dispenser, in fluid communication with the inlet port, configured to deliver an eluent in the daughter-isotope chamber, to elute in a liquid form the $^{212}$Pb daughter isotope generated in a gaseous form; a collection container, in fluid communication with the outlet port, configured to collect the $^{212}$Pb daughter-isotope eluted in a liquid form from the daughter-isotope chamber; and capping elements, respectively associated with the inlet port and the outlet port, each capping element being configurable between a sterilization position and an operational position, wherein in the sterilization position, the corresponding ports are blocked, and the isotope generator is adapted to be sterilized, and in the operational position, the corresponding ports are open, an emanation process naturally occurs and the $^{220}$Rn flows from the parent-isotope chamber, through the membrane, to the daughter-isotope chamber, and then decaying into the $^{212}$Pb daughter isotope where the $^{212}$Pb daughter isotope is extracted by the eluent and carried to the collection container, wherein the isotope generator is scalable based on required $^{212}$Pb daughter-isotope quantities to be generated, the $^{212}$Pb daughter-isotope quantities ranging from 1 mCi to 500 mCi.

In an embodiment, the $^{212}$Pb daughter isotope is produced by emanation of $^{220}$Rn gas from $^{224}$Ra without recourse to external utilities.

In an embodiment, the parent-isotope dispenser is configured to receive Nitrogen or Argon or other inert gas(es) into the parent-isotope dispenser, to displace any air in the headspace of the parent-isotope dispenser.

In an embodiment, the capping elements further comprise a capping element associated with the load port, wherein the capping element associated with the load port is a septum.

In an embodiment, the capping elements comprise an eluent-cap plug protecting the eluent dispenser and a parent-isotope cap plug protecting the parent isotope dispenser, the caps being removable to initiate the daughter isotope emanation process.

In an embodiment, the closed retainer assembly defines an isotope generator chamber which comprises the parent-isotope chamber, the daughter-isotope chamber and the membrane separating the two chambers.

In an embodiment, the $^{220}$Rn in its gaseous form is mechanically separated from the parent isotope by its passage through the membrane, without recourse to external utilities.

In an embodiment, the gas permeable membrane defines an exchange chamber between a first surface facing the parent-isotope chamber and a second surface facing the daughter-isotope chamber.

In an embodiment, the first surface facing the parent-isotope chamber is hydrophobic, for maintaining the parent isotope in a liquid form.

In an embodiment, the second surface facing the daughter-isotope chamber is hydrophobic, to prevent permeation of the $^{212}Pb$ daughter isotope from the daughter-isotope chamber back to the parent-isotope chamber.

In an embodiment, the gas permeable membrane is radiation hardened, for preventing damages to the membrane due to radiolysis of emitted alpha, beta and gamma particles generated by the emanation process.

In an embodiment, the exchange chamber comprises a recirculation air change path to force air exchange between the parent-isotope chamber and the daughter-isotope chamber.

In an embodiment, the load port is located on top of the parent-isotope chamber, and substantially centered along a length of parent-isotope chamber.

In an embodiment, the gas permeable membrane has a surface significantly greater than the load port, to optimize the daughter isotope generation.

In an embodiment, the parent-isotope chamber is provided on top of the daughter-isotope chamber, the gas permeable membrane extending horizontally and longitudinally between the chambers.

In an embodiment, the inlet port and the outlet port are located at opposed lateral ends of the daughter-isotope chamber.

In an embodiment, the inlet port and the outlet port are located on a bottom of the daughter-isotope chamber and spaced apart from each other.

In an embodiment, in operation, the eluent in the daughter-isotope chamber flows longitudinally from the inlet port to the outlet port.

In an embodiment, the closed retainer assembly has a cylinder configuration, with the parent-isotope chamber being provided in a centered cylinder, the gas permeable membrane extending on a peripheral surface of the centered cylinder of the parent-isotope chamber, and the daughter-isotope chamber having an annular configuration extending circumferentially from the gas permeable membrane, the parent-isotope chamber, the gas permeable membrane and the daughter-isotope chamber being concentric.

In an embodiment, the load port is located on a lateral side of the parent-isotope chamber, and substantially aligned with the center of the parent-isotope chamber.

In accordance with an embodiment, there is provided a terminally sterilized isotope generator for producing a $^{212}Pb$ daughter isotope by emanation of $^{220}Rn$ gas from Radium-224, the isotope generator comprising a parent-isotope chamber, divided into a lower zone initially loaded with $^{224}Ra$ onto a sponge or glass wool, and an upper zone extending above the lower zone, the lower zone and the upper zone being in fluid communication with each other, the parent-isotope chamber having a gas outlet port in the upper zone; a daughter-isotope chamber for collecting the $^{212}Pb$ daughter isotope, the daughter-isotope chamber having a gas inlet port in an upper zone of the daughter-isotope chamber; a controllable gas duct, connected between the gas outlet port and the gas inlet port, the controllable gas duct being configurable between an open configuration fluidly connecting the gas outlet port of the parent-isotope chamber to the gas inlet port of the daughter-isotope chamber, and a closed configuration fluidly isolating the gas outlet port of the parent-isotope chamber from the gas inlet port of the daughter-isotope chamber; an eluent dispenser, configured to deliver an eluent; a controllable eluent duct having three ends; a first end in fluid communication with the eluent dispenser to receive the eluent; a second end in fluid communication with the parent-isotope chamber; and a third end in fluid communication with the daughter-isotope chamber, wherein the controllable eluent duct is configurable between a loading configuration fluidly connecting the first end to the third end to fill the daughter-isotope chamber with the eluent and to elute in a liquid form the $^{212}Pb$ daughter isotope generated in a gaseous form, and a mix configuration fluidly connecting the second end to the third end to allow remaining $^{220}Rn$ to circulate from the daughter-isotope chamber to the parent-isotope chamber; and a collection container, in fluid communication with an outlet port located in a lower zone of the daughter-isotope chamber, configured to collect the $^{212}Pb$ daughter-isotope eluted in a liquid form from the daughter-isotope chamber, wherein the parent-isotope chamber further comprises a first actuator for creating a vortex, wherein when actuated, the vortex created initiate the generation of $^{220}Rn$ in a gaseous form, the $^{220}Rn$ naturally decaying from Radium-224, and force the $^{220}Rn$ in a gaseous form to circulate in the upper zone of the parent-isotope chamber through the gas outlet port, to the controllable gas duct in the open configuration, to the gas inlet port and then to the daughter-isotope chamber; wherein the daughter-isotope chamber further comprises a second actuator for creating a vortex, wherein when the controllable gas duct in the closed configuration and when actuated, the vortex created initiate the generation of $^{212}Pb$ in a gaseous form, the $^{212}Pb$ naturally decaying from $^{220}Rn$, where $^{212}Pb$ in a gaseous form is extracted by the eluent and carried to the collection container through the outlet port, wherein the isotope generator is scalable based on a required $^{212}Pb$ daughter-isotope quantities to be generated, the $^{212}Pb$ daughter-isotope quantities range from 1 mCi to 500 mCi.

In an embodiment, the first and second actuators for creating a vortex comprises a stir pellet or bar located in a bottom of the parent-isotope chamber and the daughter-isotope chamber, and a magnetic stir plate located outside and below the parent-isotope chamber and the daughter-isotope chamber, wherein when the magnetic stir plate is activated, the stir pellet or bar is engaged in a rotation.

In an embodiment, the parent isotope is Radium-224, in either aqueous form or solid form.

In an embodiment, the parent isotope is Thorium-228, which spontaneously decays into $^{224}Ra$ in the parent-isotope chamber.

In an embodiment, the parent-isotope chamber and the daughter-isotope chamber are defined with rounded, smooth walls, geometric configurations of the chambers being devoid of dead volumes, thereby facilitating terminal sterilization of the isotope generator with hot steam-air mixture or other dorms of sterilization.

In an embodiment, the fluid collected in the collection container comprises greater than 90% of pure $^{212}Pb$ daughter isotope.

In an embodiment, the eluent is Hydrochloric acid, Nitric acid, or any other suitable acid solution to capture the $^{212}Pb$ daughter isotope in an aqueous solution.

In an embodiment, the isotope generator comprises an eluent filter located downstream of the outlet port further, to filter the fluid resulting from an elution process and provide a high-purity $^{212}Pb$ daughter isotope and to minimize any bioburden in the fluid.

In an embodiment, the isotope generator is self-contained in a radiation shielded housing.

In an embodiment, the shielded housing is sized and configured to be transportable and provide adequate radiation shielding protection during the transportation process.

In an embodiment, the parent-isotope chamber is filled with glass beads, quartz or glass wool or a radiation-hardened substrate, for tagging of the parent isotope thereon.

In an embodiment, radiation-hardened substrate is any one of barium-stearate, zirconium chloride, or other acid-activated substrate(s).

In an embodiment, the parent-isotope chamber is filled with a hydrogel compound for absorbing Radium-224.

In an embodiment, the daughter-isotope chamber is filled with glass beads or quartz or glass wool.

In an embodiment, the daughter-isotope chamber further comprises radiation hardened filter fibers that enable tangential flow filtration.

In an embodiment, materials selected for the closed retainer assembly and shielded housing allow for sterilization of the isotope generator.

In an embodiment, the collection container is a stoppered and crimp sealed vial and free from cap or plug.

In accordance with an embodiment, there is provided a method for producing terminally sterilized pure alpha-emitting daughter isotope, comprising the steps of delivering a parent isotope into a parent-isotope chamber of a closed retainer assembly for initiating a $^{220}$Rn emanation process by natural decay of the parent isotope in the parent-isotope chamber; transferring the $^{220}$Rn in a gaseous form into a daughter-isotope chamber, through a gas-permeable membrane separating the parent-isotope chamber and the daughter-isotope chamber, the membrane allowing the $^{220}$Rn to passively pass therethrough under the action of gravity or diffusion; generating a $^{212}$Pb daughter isotope by natural decay of $^{220}$Rn in the daughter-isotope chamber; circulating an eluent in the daughter-isotope chamber, to elute the $^{212}$Pb daughter isotope generated in a gaseous form; collecting the $^{212}$Pb daughter isotope eluted in a liquid form from the daughter-isotope chamber into a collection container; and sealing the collection container filled of the $^{212}$Pb daughter isotope with a daughter isotope cap plug, to ensure sterilized collection container and maintain closed collection container integrity.

In an embodiment, the step of delivering the parent isotope further comprises opening a parent-isotope cap plug.

In an embodiment, the step of circulating an eluent in the daughter-isotope chamber further comprises removing an eluent-cap plug protecting the eluent dispenser; injecting the eluent in an inlet port of the daughter-isotope chamber by the action of gravity, the eluent dispenser being upstream of the inlet port; and ejecting the eluent in an outlet port, the outlet port being located at opposed lateral end of the daughter-isotope chamber from the inlet port.

In an embodiment, the step of collecting the $^{212}$Pb daughter isotope further comprises opening the daughter-isotope cap plug.

In accordance with an embodiment, there is provided a method for producing terminally sterilized pure alpha-emitting daughter isotope, comprising the steps of providing a parent-isotope chamber loaded with a parent isotope for initiating a $^{220}$Rn emanation process by natural decay of the parent isotope in the parent-isotope chamber; initiating a vortex in the parent-isotope chamber to initiate a movement of $^{220}$Rn particles upstream; transferring the $^{220}$Rn in a gaseous form into a daughter-isotope chamber, through a controllable gas duct connecting the parent-isotope chamber to the daughter-isotope chamber, the controllable gas duct configured in an open configuration allowing the $^{220}$Rn to passively pass therethrough; generating a $^{212}$Pb daughter isotope by natural decay of $^{220}$Rn in the daughter-isotope chamber; circulating an eluent in the daughter-isotope chamber, to elute the $^{212}$Pb daughter isotope generated in a gaseous form; collecting the $^{212}$Pb daughter isotope eluted in a liquid form from the daughter-isotope chamber into a collection container; and sealing the collection container filled of the $^{212}$Pb daughter isotope with a daughter isotope cap plug, to ensure sterilized collection container and maintain closed collection container integrity.

The following aspects are also disclosed herein:

A terminally sterilized isotope generator for producing an alpha-emitting Lead-212 ($^{212}$Pb) daughter isotope by emanation of Radon-220 ($^{220}$Rn) gas from a parent isotope, the isotope generator comprising:

a closed retainer assembly comprising:

a parent-isotope chamber for receiving the parent isotope, a daughter-isotope chamber for collecting the $^{212}$Pb daughter isotope, and a gas permeable membrane separating the parent-isotope chamber from the daughter-isotope chamber, wherein the parent isotope is naturally decaying into $^{220}$Rn within the parent-isotope chamber, and wherein the gas permeable membrane allows the $^{220}$Rn to passively pass therethrough under an action of gravity or diffusion, wherein the $^{220}$Rn is spontaneously decaying into $^{212}$Pb within the daughter-isotope chamber;

a load port opening in the parent-isotope chamber, an inlet port and an outlet port, spaced apart from each other, and both opening in the daughter-isotope chamber, a parent-isotope dispenser, in fluid communication with the load port, configured to deliver the parent isotope into the parent-isotope chamber;

an eluent dispenser, in fluid communication with the inlet port, configured to deliver an eluent in the daughter-isotope chamber, to elute in a liquid form the $^{212}$Pb daughter isotope generated in a gaseous form;

a collection container, in fluid communication with the outlet port, configured to collect a $^{212}$Pb eluate, corresponding to the $^{212}$Pb daughter isotope eluted in a liquid form from the daughter-isotope chamber; and capping elements, respectively associated with the inlet port and the outlet port, each capping element being configurable between a sterilization position and an operational position, wherein in the sterilization position, the corresponding ports are blocked, and the isotope generator is adapted to be sterilized, and in the operational position, the corresponding ports are open, an emanation process naturally occurs and the $^{220}$Rn flows from the parent-isotope chamber, through the gas permeable membrane, to the daughter-isotope chamber, and then decaying into the $^{212}$Pb daughter isotope where the $^{212}$Pb daughter isotope is extracted by the eluent and carried to the collection container, wherein the isotope generator is scalable based on required $^{212}$Pb daughter-isotope quantities to be generated, the required $^{212}$Pb daughter-isotope quantities ranging from 1 mCi to 500 mCi.

The isotope generator of aspect 1, wherein the $^{212}$Pb daughter isotope is produced by emanation of $^{220}$Rn gas from the parent isotope without recourse to external utilities.

The isotope generator of aspect 1, wherein the capping elements further comprise:

a capping element associated with the load port, wherein the capping element associated with the load port is a septum;

an eluent-cap plug protecting the eluent dispenser; and a parent-isotope cap plug protecting the parent-isotope dispenser, wherein the eluent-cap plug and the parent-isotope cap plug are removable to initiate a daughter isotope emanation process.

The isotope generator of aspect 1, wherein the $^{220}Rn$ in its gaseous form is mechanically separated from the parent isotope by its passage through the gas permeable membrane, without recourse to external utilities.

The isotope generator of aspect 1, wherein a first surface of the membrane facing the parent-isotope chamber is hydrophobic, for maintaining the parent isotope in a liquid form, and wherein the second surface facing the daughter-isotope chamber is hydrophobic, to prevent permeation of the $^{212}Pb$ daughter isotope from the daughter-isotope chamber back to the parent-isotope chamber.

The isotope generator of aspect 1, wherein the gas permeable membrane is radiation hardened, for preventing damages to the membrane due to radiolysis of emitted alpha, beta and gamma particles generated by the emanation process.

The isotope generator of aspect 1, wherein the gas permeable membrane defines an exchange chamber between a first surface facing the parent-isotope chamber and a second surface facing the daughter-isotope chamber, and wherein the exchange chamber comprises a recirculation air change path to force air exchange between the parent-isotope chamber and the daughter-isotope chamber.

The isotope generator of aspect 1, wherein the parent isotope is Radium-224 ($^{224}Ra$), in either aqueous form or solid form.

The isotope generator of aspect 1, wherein the parent isotope is Thorium-228 ($^{228}Th$), which spontaneously decays into $^{224}Ra$ in the parent-isotope chamber.

The isotope generator of aspect 1, wherein the $^{212}Pb$ eluate collected in the collection container comprises greater than 90% of pure $^{212}Pb$ daughter isotope, and more preferably greater than 95% of pure $^{212}Pb$ daughter isotope.

The isotope generator of aspect 1, wherein the eluent is Hydrochloric acid, Nitric acid, or any other suitable acid solution to capture the $^{212}Pb$ daughter isotope in an aqueous solution.

The isotope generator of aspect 1, comprising an eluent filter located downstream of the outlet port further, to filter the fluid resulting from an elution process and provide a high-purity $^{212}Pb$ daughter isotope and to minimize any bioburden in the fluid.

The isotope generator of aspect 1, wherein the isotope generator is self-contained in a radiation shielded housing, and wherein the radiation shielded housing is sized and configured to be transportable and provide adequate radiation shielding protection during a transportation process.

The isotope generator of aspect 1, wherein the parent-isotope chamber is filled with glass beads, or quartz wool, or glass wool, or a resin material, or a radiation-hardened substrate, for tagging of the parent isotope thereon.

The isotope generator of aspect 14, wherein the radiation-hardened substrate is any one of barium-stearate, zirconium chloride, or other acid-activated substrate(s).

A terminally sterilized isotope generator for producing a $^{212}Pb$ daughter isotope by emanation of Radon-220 ($^{220}Rn$) gas from a parent isotope, the isotope generator comprising:

a parent-isotope chamber, divided into a lower zone initially loaded with the parent isotope onto a sponge or glass wool, and an upper zone extending above the lower zone, the lower zone and the upper zone being in fluid communication with each other, the parent-isotope chamber having a gas outlet port in the upper zone;

a daughter-isotope chamber for collecting the $^{212}Pb$ daughter isotope, the daughter-isotope chamber having a gas inlet port in an upper zone of the daughter-isotope chamber;

a controllable gas duct, connected between the gas outlet port and the gas inlet port, the controllable gas duct being configurable between an open configuration fluidly connecting the gas outlet port of the parent-isotope chamber to the gas inlet port of the daughter-isotope chamber, and a closed configuration fluidly isolating the gas outlet port of the parent-isotope chamber from the gas inlet port of the daughter-isotope chamber;

an eluent dispenser, configured to deliver an eluent;

a controllable eluent duct having three ends;

a first end in fluid communication with the eluent dispenser to receive the eluent;

a second end in fluid communication with the parent-isotope chamber; and a third end in fluid communication with the daughter-isotope chamber, wherein the controllable eluent duct is configurable between a loading configuration fluidly connecting the first end to the third end to fill the daughter-isotope chamber with the eluent and to elute in a liquid form the $^{212}Pb$ daughter isotope generated in a gaseous form, and a mix configuration fluidly connecting the second end to the third end to allow remaining $^{220}Rn$ to circulate from the daughter-isotope chamber to the parent-isotope chamber; and a collection container, in fluid communication with an outlet port located in a lower zone of the daughter-isotope chamber, configured to collect the $^{212}Pb$ daughter isotope eluted in a liquid form from the daughter-isotope chamber, wherein the parent-isotope chamber further comprises a first actuator for creating a vortex, wherein when actuated, the vortex created initiate generation of $^{220}Rn$ in a gaseous form, the $^{220}Rn$ naturally decaying from $^{224}Ra$, and force the $^{220}Rn$ in a gaseous form to circulate in the upper zone of the parent-isotope chamber through the gas outlet port, to the controllable gas duct in the open configuration, to the gas inlet port and then to the daughter-isotope chamber;

wherein the daughter-isotope chamber further comprises a second actuator for creating a vortex, wherein when the controllable gas duct in the closed configuration and when actuated, the vortex created initiate a generation of $^{212}Pb$ in a gaseous form, the $^{212}Pb$ naturally decaying from $^{220}Rn$, where $^{212}Pb$ in a gaseous form is extracted by the eluent and carried to the collection container through the outlet port, wherein the isotope generator is scalable based on a required $^{212}Pb$ daughter-isotope quantities to be generated, the required $^{212}Pb$ daughter-isotope quantities range from 1 mCi to 500 mCi.

The isotope generator of aspect 16, wherein the first and second actuators for creating vortex comprises:

a stir pellet or a bar located in a bottom of the parent-isotope chamber and the daughter-isotope chamber, and a magnetic stir plate located outside and below the parent-isotope chamber and the daughter-isotope chamber, wherein when the magnetic stir plate is activated, the stir pellet or the bar is engaged in a rotation.

The isotope generator of aspect 16, wherein the parent-isotope chamber is filled with a hydrogel compound for absorbing $^{224}$Ra, and wherein the daughter-isotope chamber is filled with glass beads, or quartz wool, or glass wool, or a resin material.

The isotope generator of aspect 16, wherein the daughter-isotope chamber further comprises radiation hardened filter fibers that enable tangential flow filtration.

A method for producing terminally sterilized pure alpha-emitting daughter isotope, comprising the steps of:

- delivering a parent isotope into a parent-isotope chamber of a closed retainer assembly for initiating a $^{220}$Rn emanation process by natural decay of the parent isotope in the parent-isotope chamber;
- transferring the $^{220}$Rn in a gaseous form into a daughter-isotope chamber, through a gas permeable membrane separating the parent-isotope chamber and the daughter-isotope chamber, the gas permeable membrane allowing the $^{220}$Rn to passively pass therethrough under an action of gravity or diffusion;
- generating a $^{212}$Pb daughter isotope by natural decay of $^{220}$Rn in the daughter-isotope chamber;
- circulating an eluent in the daughter-isotope chamber, to elute the $^{212}$Pb daughter isotope generated in a gaseous form;
- collecting the $^{212}$Pb daughter isotope eluted in a liquid form from the daughter-isotope chamber into a collection container; and
- sealing the collection container filled of the $^{212}$Pb daughter isotope with a daughter isotope cap plug, to ensure sterilized collection container and maintain closed collection container integrity.

BRIEF DESCRIPTION OF THE DRAWINGS

The accompanying drawings, which are incorporated in and constitute a part of the specification, illustrate embodiments and together with the detailed description herein, serve to explain the principles of the realization. The drawings are only for purposes of illustrating embodiments and are not to be construed as limiting the realization. It is emphasized that, in accordance with the standard practice in the industry, various features are not drawn to scale. The foregoing and other objects, features and advantages of the realization are apparent from the following detailed description taken in conjunction with the accompanying drawings in which.

DETAILED DESCRIPTION

Various features and advantages of the terminally sterilized isotope generator for producing a Lead-212 ($^{212}$Pb) daughter isotope will be better understood upon a reading of embodiments thereof with reference to the appended drawings.

It is worth noting that the same numerical references refer to similar elements. In addition, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, although the embodiments of the isotope generator and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation there in between, as well as other suitable geometrical configurations, may be used for the device, as will be briefly explained herein and as can be easily inferred therefrom by a person skilled in the art.

Moreover, it will be appreciated that positional descriptions such as “above”, “below”, “forward”, “rearward”, “left”, “right”, and the like should, unless otherwise indicated, be taken in the context of the figures and correspond to the position and orientation of the isotope generator as disclosed herein. Positional descriptions should not be considered limiting.

In general, the present application describes a terminally sterilized isotope generator for producing $^{212}$Pb daughter isotope.

In a preferred embodiment, the isotope generator for producing $^{212}$Pb daughter isotope can be “dry” or “passive”, i.e., no external utilities, such as electrical power, vacuum supply, noble gas etc. are needed to operate the isotope generator. In another embodiment, the isotope generator for producing $^{212}$Pb daughter isotope can be “active”, comprising systems to introduce inert gases or to initiate vortex. The isotope generator as disclosed therein can be used to produce $^{212}$Pb daughter isotope by physically separating and collecting in an eluate the gas emanation of $^{212}$Pb daughter isotope from a parent isotope. The parent isotope can be Thorium-228 ($^{228}Th$) or Radium-224 ($^{224}Ra$), or any other parent isotope used in the medical domain.

Figure 1:
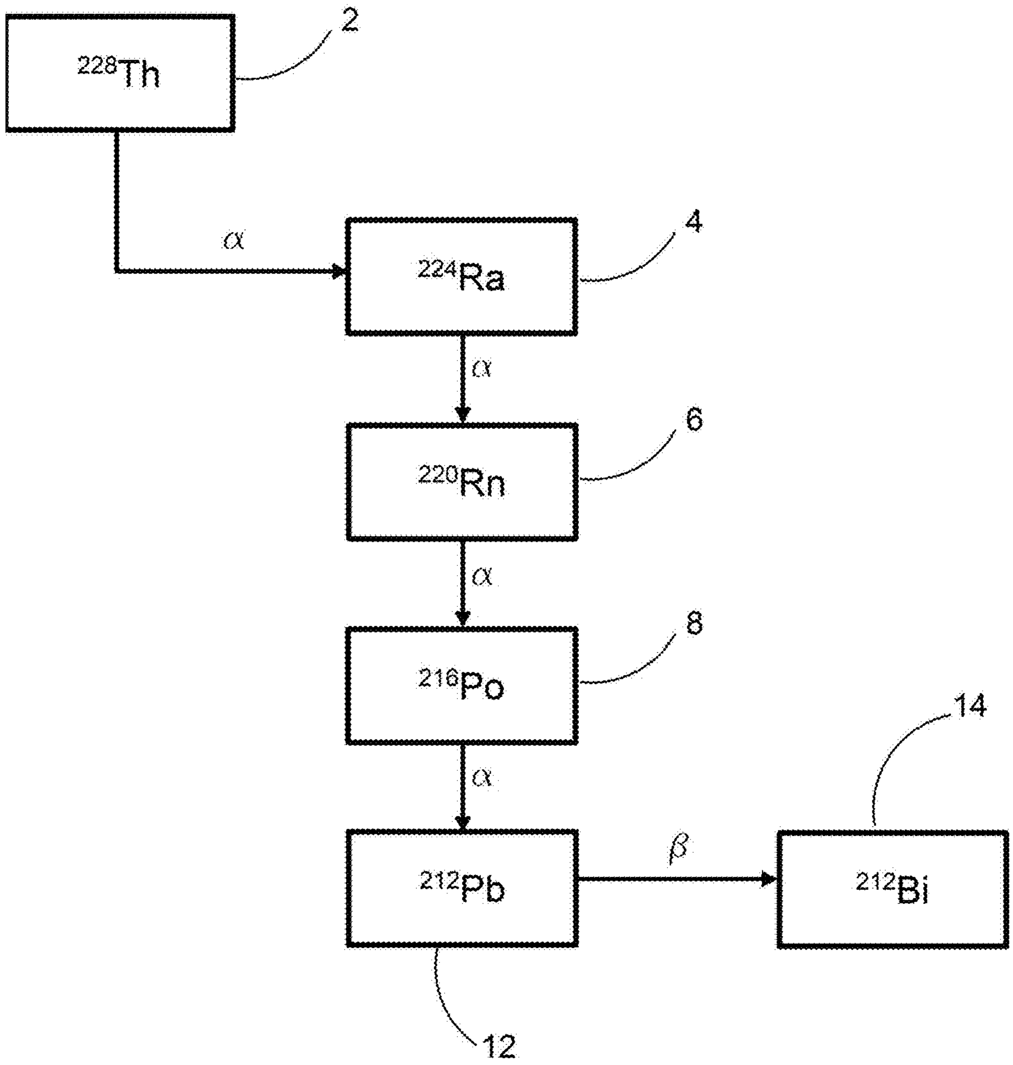
FIG. 1 is a block diagram showing the decay scheme from $^{228}$Th to $^{212}$Bi.

As shown in FIG. 1, $^{212}Pb$ 12 is generated in the decay chain from $^{228}Th$ 2. The parent isotope $^{228}Th$ alpha-decays into $^{224}Ra$ 4. In a preferred embodiment, $^{224}Ra$ can be used directly as a parent isotope, especially because of the long decay time of $^{228}Th$ 2. The isotope generator provides gas-phase separation of an intermediate noble gas by alpha-decay, Radon-220 ($^{220}Rn$) 6, from the $^{224}Ra$ 4. $^{220}Rn$ further alpha decays very quickly into another intermediate isotope, namely Polonium-216 ($^{216}Po$) 8. A subsequent alpha-decay of the captured $^{218}Po$ 8 then occurs and emanates into a high purity radioactive $^{212}Pb$ isotope 12. Thus, $^{212}Pb$ can be isolated from $^{220}Rn$ by natural decay, and without the need for dedicated equipment for the separation process. It is understood that other daughter-isotopes can be generated with such isotope generators. For example, $^{212}Pb$ 12 can further beta-decay into Bismuth-212 ($^{212}Bi$) 14. In the embodiment where the parent isotope is $^{228}Th$, a preliminary decaying of $^{228}Th$ into $^{224}Ra$ is initiated in the isotope generator.

Each isotope or radioisotope as defined in FIG. 1 is characterized by its half-life ($t_{1/2}$). Half-life is the length of time it takes for half of the parent isotope to decay into the daughter isotope (the faster the rate of decay, the shorter the half-life).

For example, the half-life of the isotope as defined in FIG. 1 are given in the table below:

TABLE 1

Isotopes half-life

| Isotope | Half-life ($t_{1/2}$) |
|---|---|
| $^{228}Th$ | 1.9 years |
| $^{224}Ra$ | 3.6 days |
| $^{220}Rn$ | 56 seconds |
| $^{216}Po$ | 0.15 seconds |
| $^{212}Pb$ | 10.6 hours |
| $^{212}Bi$ | 61 minutes |

The $^{212}Pb$ daughter isotope produced is a high level of purity alpha emitting isotope that can be used for targeted alpha therapies (TAT) in medical treatments against cancer for example. Targeted alpha therapy is based on the coupling of alpha particle-emitting radioisotopes, such as $^{212}Pb$, to tumor-selective carrier molecules, such as monoclonal antibodies or peptides.

However, the life duration of a $^{212}Pb$ isotope generated by decay is limited (short half-life of $^{212}Pb$, around 10 hours as shown in table 1 above). The $^{212}Pb$ isotope generated must be used within a certain period of time, otherwise such $^{212}Pb$ will start decaying into another daughter isotope. For TAT, the $^{212}Pb$ isotope generation should preferably be performed on-site (in the radio-pharmacy). Rapid and efficient processes are required to ensure sufficient $^{212}Pb$ availability for end users. Therefore, there is a need for an easy-to-handle isotope generator, and rapid and efficient process to generate high purity $^{212}Pb$ easily accessible for end-user (such as radio-pharmacy network) and in the desired quantity.

The term "high level of purity" refers to a fluid charged in $^{212}Pb$ collected in the collection container (a $^{212}Pb$ eluate) that comprises more than 90% of $^{212}Pb$ daughter isotope.

The radiochemical (or radiological) purity (RCP) of the generated $^{212}Pb$ daughter isotope corresponds to the proportion of the total $^{212}Pb$ daughter isotope in the $^{212}Pb$ eluate. In other words, the RCP is defined as the percent of total radioactivity present in the $^{212}Pb$ eluate. Having high RCP is important since it is the radiochemical form which determines the biodistribution of the radiopharmaceuticals.

In some embodiment, the isotope generator for producing $^{212}Pb$ daughter isotope as described herein allows the production of the $^{212}Pb$ daughter isotope eluate with a level of purity of more than 95%, which can reach and even exceed 99%.

The isotope generator can be a terminally sterilized closed container. By "terminally sterilized", it is meant that the isotope generator is free of any microbial contamination that could pollute the isotope generator. In a possible embodiment, the terminal sterilization of the generator is achieved by preventing any liquid from entering the flow path during the sterilization process. This can be achieved by capping all inlets of the isotope generator. The capping of all inlets improves retention of the parent isotope in the closed retainer assembly. Other means may be used to complete a sterile barrier system where no seal is formed to minimize the risk of ingress of microorganisms.

The terminal sterilization of the generator is also achieved by exposing the entire closed retainer assembly to sterilization, at the beginning of the process of generating the daughter isotope. Sterilization can be done with a hot steam-air mixture, or using an autoclave, dry heat, sterilizing gaseous (for example, ethylene oxide, chlorine dioxide, hydrogen peroxide) or liquid (such as glutaraldehyde, hydrogen peroxide, formaldehyde) chemicals, gamma, X-ray or electron beam irradiation, UV-ozone treatment, or any other forms of sterilization. The terminal sterilization of the generator implies that the sterilizing agent (e.g. steam) can penetrate all components. This type of sterilization differs from aseptic processing, where products or components are sterilized separately and are later put together in a sterile environment.

Two different configurations of the isotope generator are described in the next paragraphs. In a first configuration, shown in FIGS. 2 to 7, the isotope generator 10 comprises a closed retainer assembly 20 which comprises a parent-isotope chamber 30, a daughter-isotope chamber 40, and a gas permeable membrane 50 between the chambers. The "closed retainer assembly" comprises the chambers and components where the emanation and collection processes occur. In a second configuration, shown in FIGS. 8 to 10, the isotope generator 110 also comprises a parent-isotope chamber 130, and a daughter-isotope chamber 140, but instead of a gas permeable membrane, a tube or duct assembly is provided between the two chambers. In the second configuration, a vortex is initiated in each chamber to promote emanation of the $^{212}Pb$ daughter isotope in the parent chamber and isolate the $^{212}Pb$ in the daughter chamber. As can be appreciated, both configurations comprise a parent-isotope chamber 30, 130, a daughter-isotope chamber 40, 140 and a "transit" assembly or medium through which the daughter isotope can migrate from the parent-isotope chamber to the daughter-isotope chamber.

Figure 4:
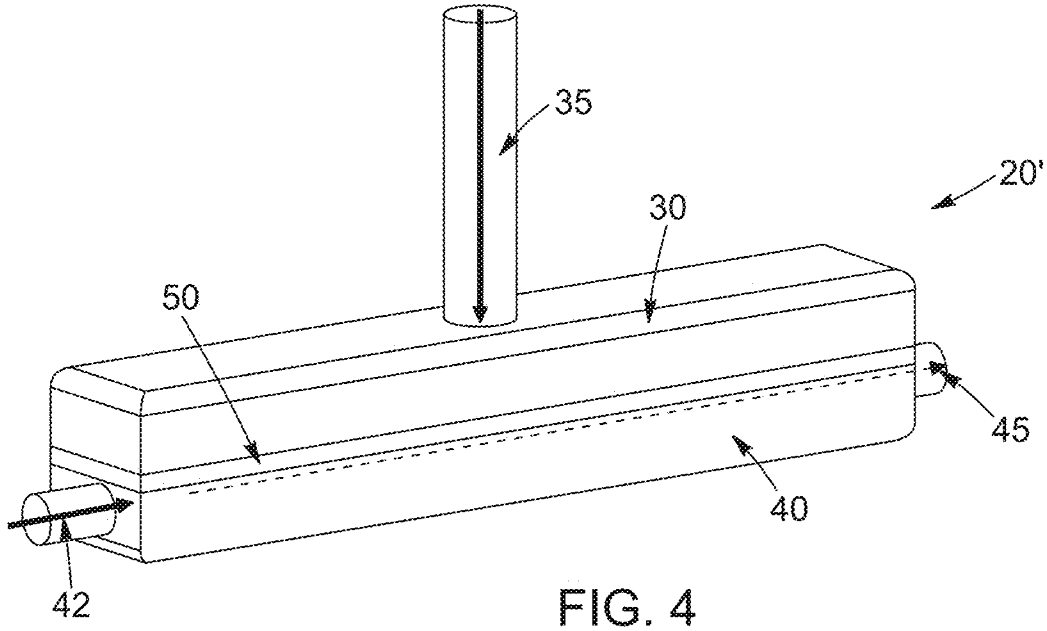
FIG. 4 is a side elevation view of the closed retainer assembly of FIG. 3.
Figure 5:
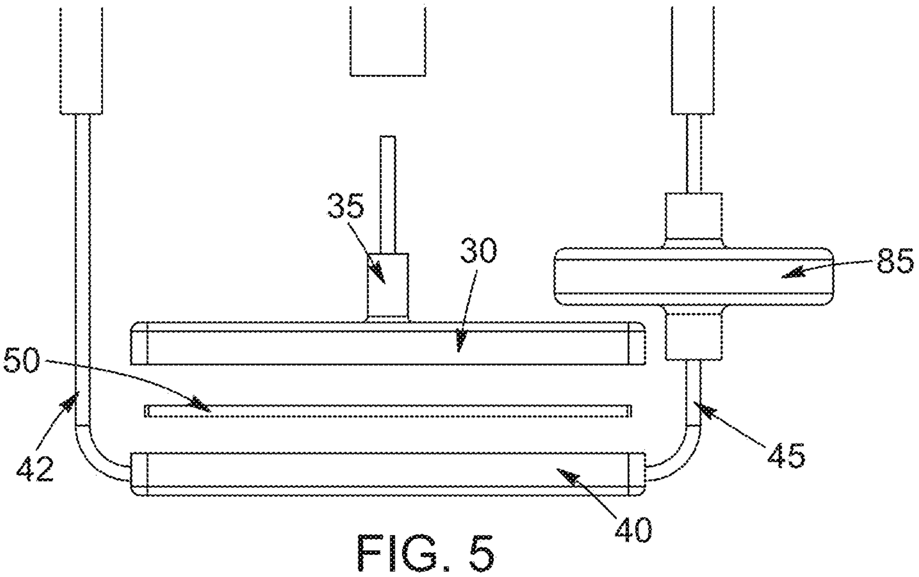
FIG. 5 is an exploded view of the closed retainer assembly of FIGS. 3 and 4, with a filter connected to an outlet port of the closed retainer.
Figure 6:
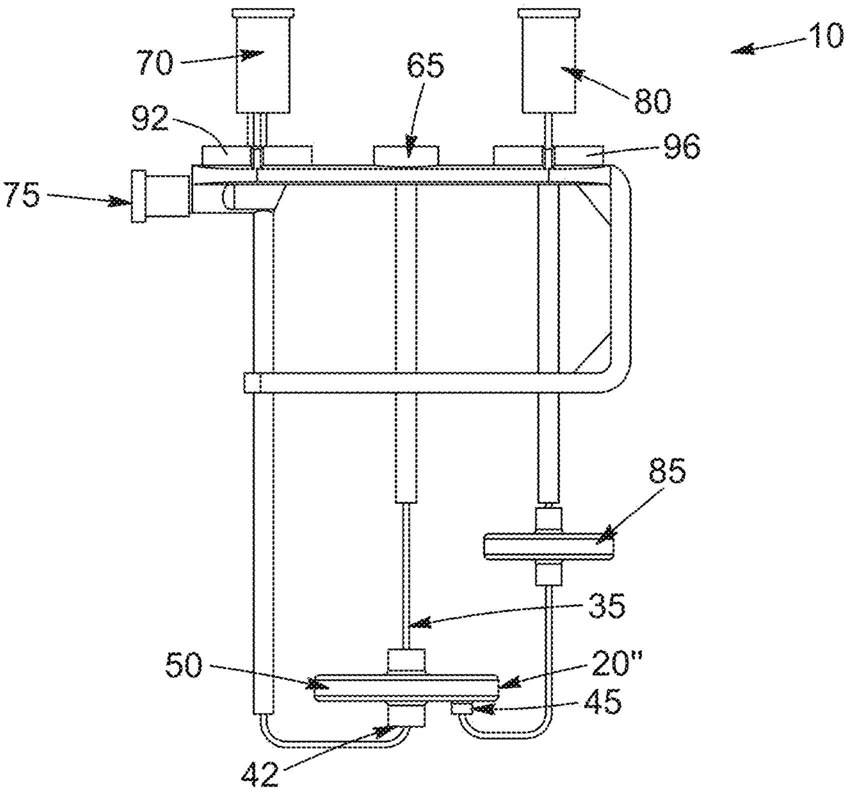
FIG. 6 is a cross-sectional side view of a terminally sterilized isotope generator for producing a $^{212}$Pb daughter isotope, in accordance with a second embodiment, wherein the closed retainer assembly is a hydrophobic/gasphilic filter.

With regard to the first generator configuration, three different embodiments are provided. In FIGS. 4 and 5, a first embodiment of an isotope generator is shown, in which the closed retainer assembly 20' corresponds to a packed glass column with glass beads (not shown). In FIG. 6, a second embodiment is illustrated, in which the closed retainer assembly corresponds to a hydrophobic/gasphilic filter 20''. Finally, in FIG. 7, a third embodiment is illustrated, in which the closed retainer assembly corresponds to a tangential flow filter (TFF) 20'''.

It is understood that the embodiments described in connection with FIGS. 2 to 10 are only possible embodiments, among others. For example, the closed retainer assembly could be a liquid degassing system using a membrane degasser, or the isotope generator could have a piston chamber for gas emanation in two separate chambers, or any other way of decaying a parent isotope into a $^{212}$Pb daughter isotope.

Closed Retainer Assembly Configuration

Figure 2:
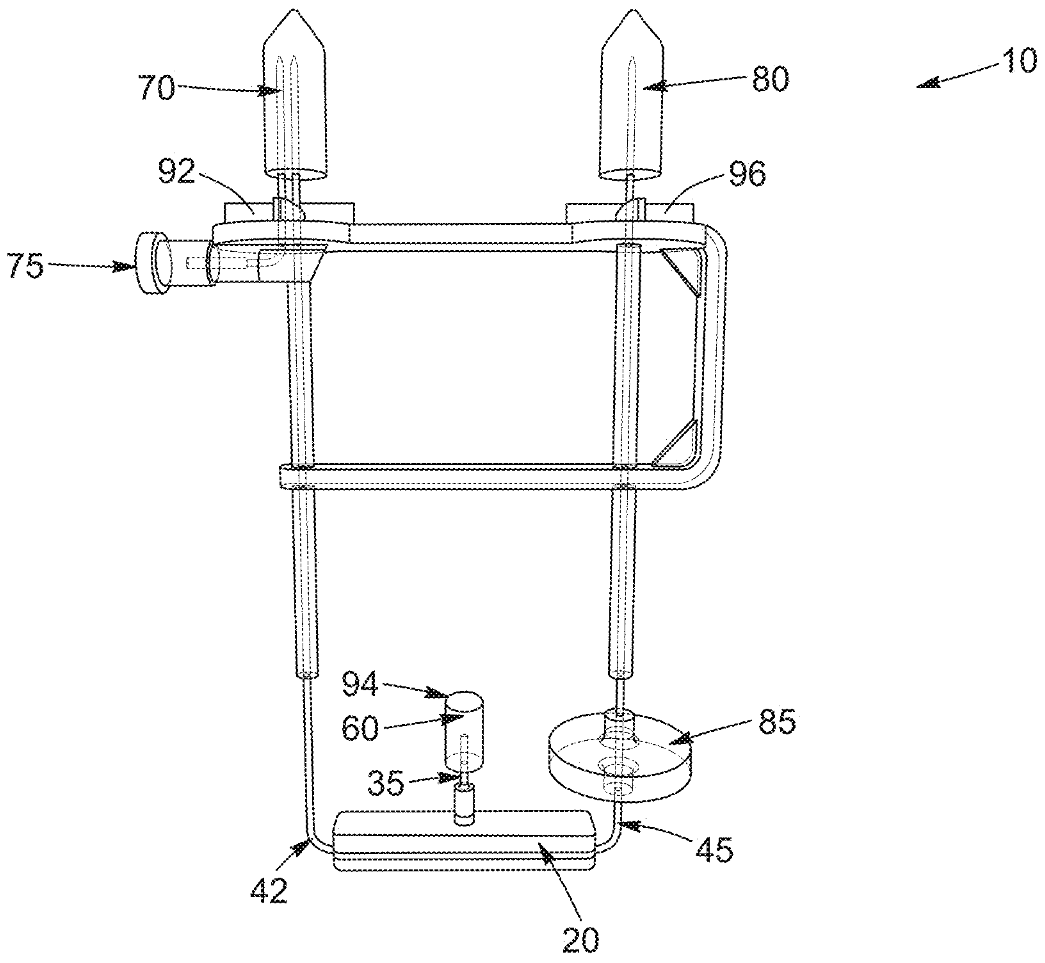
FIG. 2 is a side elevation view of a terminally sterilized isotope generator for producing a Lead-212 ($^{212}$Pb) daughter isotope, in accordance with a first configuration.

Referring to FIGS. 2 to 7, a first possible configuration of the isotope generator 10 is shown. As shown in FIG. 2, the isotope generator 10 comprises a closed retainer assembly 20 with a load port 35, an inlet port 42, and an outlet port 45, spaced apart from each other. The load port 35, the inlet port 42 and the outlet port 45 all open in the closed retainer assembly 20. The inlet and outlet ports 42, 45 open in the daughter isotope chamber 40, while the load port opens in the parent-isotope chamber 30. The isotope generator 10 further comprises a parent-isotope dispenser 60, an eluent dispenser 70, a collection container 80, and cap plugs 92, 94, 96. The parent isotope can decay into a $^{212}$Pb daughter isotope in the closed retainer assembly 20. A detailed description of possible embodiments of the closed retainer assembly 20 will be given below.

In preferred embodiments, the shape of the closed retainer assembly is rounded, with smooth walls, such that the geometric configuration of the chambers is devoid of dead volumes, to facilitate terminal sterilization of the isotope generator. The materials selected for the closed retainer assembly and the shielded housing are selected to allow for the sterilization of the isotope generator. These materials may include lead, tungsten or Depleted Uranium, as examples only.

Figure 3:
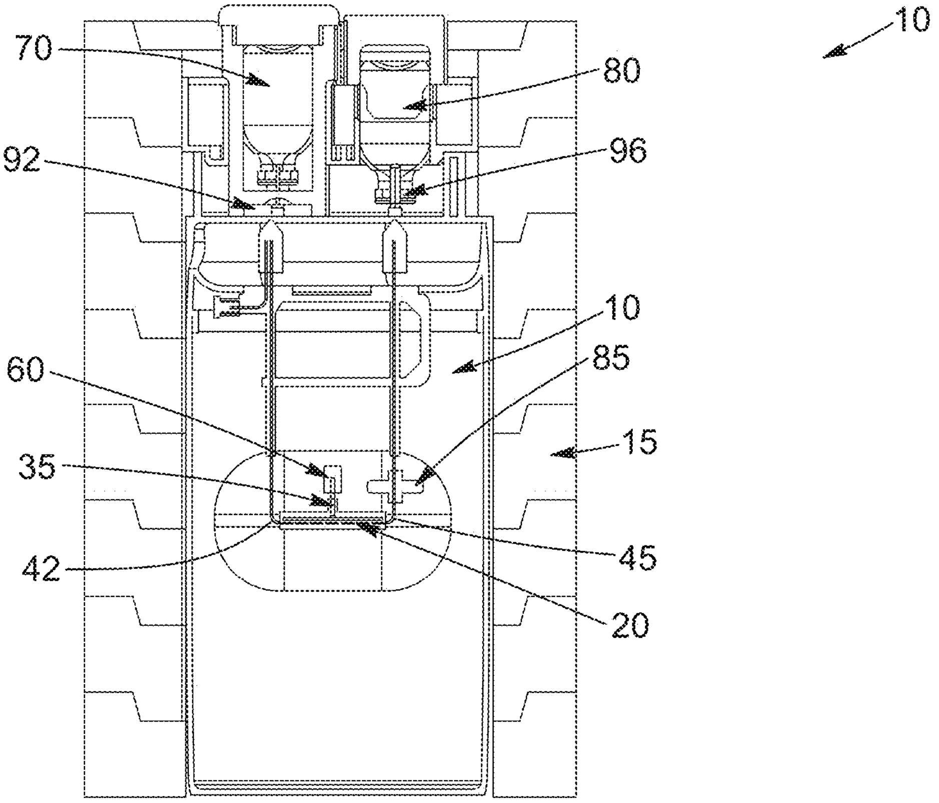
FIG. 3 is a cross-sectional side view of a terminally sterilized isotope generator for producing the $^{212}$Pb daughter isotope, in accordance with a first embodiment, wherein a closed retainer assembly is a packed glass column, and wherein the isotope generator is self-contained in a shielded housing.

As shown in FIG. 3, the isotope generator 10 can be self-contained in a radiation shielded housing 15 and is modular. By "modular", it is meant that the size of generated daughter isotope can be adapted to the volume or quantity of daughter isotope to produce. For example, the amount of the parent-isotope dispenser 60 can be adapted and scaled depending on the required $^{212}$Pb daughter-isotope quantities. Similarly, the size of the collection container 80 can also be adapted and scaled depending on the required $^{212}$Pb daughter-isotope quantities. In some embodiments, a 30 ml vial can be used as the collection container 80 (similar to those used in radio-pharmacy solutions), but it is understood that the isotope generator 10 is scalable based on required $^{212}$Pb daughter-isotope quantities to be generated. The $^{212}$Pb daughter-isotope quantities can range from 1 mCi to 500 mCi, which correspond to 37 MBq to 18,500 MBq. The radiation shielded housing 15 is sized and configured to be easily transportable and provide adequate radiation shielding protection during transport. In some embodiments, the radiation shielded housing 15 can be made of lead, tungsten or Depleted Uranium, to protect the user from alpha particles radiation. The portability of the isotope generator 10 and the high protection provided by the radiation shielding allows the radio-pharmacies operators to safely manipulate the isotope generator 10, providing better availability of the resulting $^{212}$Pb daughter-isotope eluate.

The closed retainer assembly 20 defines an isotope generator cavity or chamber which in turn comprises a parent-isotope chamber 30 for receiving a parent isotope, a daughter-isotope chamber 40 for collecting the $^{212}$Pb daughter isotope in a gaseous form, and a gas permeable membrane 50 separating the parent-isotope chamber 30 from the daughter-isotope chamber 40. The parent isotope is naturally decaying into $^{220}$Rn in a gaseous form within the parent-isotope chamber 30. The $^{220}$Rn in its gaseous form is mechanically separated from the parent isotope by its passage through the gas permeable membrane 50. The gas permeable membrane allows the $^{220}$Rn to passively pass therethrough under the action of gravity or diffusion, without recourse to external utilities such as a pump or a vacuum. The $^{220}$Rn then spontaneously decays into $^{212}$Pb in a gaseous form, within the daughter-isotope chamber 40. It is noted that the $^{220}$Rn first decays into an intermediate $^{216}$Po before decaying into $^{212}$Pb, but the half-life of $^{216}$Po being significantly short (0.15 seconds), the resulting $^{212}$Pb is only considered in the decay chain.

The parent-isotope chamber 30 can be a liquid-containing chamber that has been pre-filled with either glass beads, quartz wool or glass wool, or other resin material such as DOWEX®, AmberLite®, BIO-RAD™ AG® 50W, BIO-RAD™ AGR MP-50, or the like, or a radiation-hardened substrate like barium-stearate, zirconium chloride and others that can be acid-activated stearates to allow a $^{224}$Ra solution to be tagged onto the substrate material. The radiation-hardened substrate can be any one of barium-stearate, zirconium chloride, or other acid-activated substrates. In some embodiments, the quartz or glass wool or other resin material can be coated with Radium chloride or Radium nitrate. In some embodiments, the parent-isotope chamber 30 can also be filled with a hydrogel compound for absorbing $^{224}$Ra. The parent-isotope chamber 30 may contain a hydrogel compound that can absorb the $^{224}$Ra solution, that is directly injected into the chamber and optimized to maintain the parent isotope as a gel, while allowing the emanation of $^{220}$Rn gas.

The load port 35 of the closed retainer assembly 20 can be a tubular port extending upwardly from the closed retainer assembly 20. The lower end of the load port 35 is an opening in the parent-isotope chamber 30. The upper end of the load port 35 can be mounted with a needle, to fluidly connect the parent-isotope dispenser 60 with the load port 35, configured to deliver the parent isotope into the parent-isotope chamber 30. The needle can be made of any metal resistant to oxidation, corrosion and tagging, including but without limiting to austenitic nickel-chromium-based superalloys such as Inconel™. The needle can also be small needle side port to minimize the risk of leakage of the parent isotope and to better control the dispensing flow. The parent isotope can be a $^{224}$Ra solution, the $^{224}$Ra solution can be bulk formulated to a pre-determined concentration (mCi/microL) and dispensed onto the parent-isotope chamber via the load port 35. Upon dispensing of the formulated bulk solution of parent isotope into the parent-isotope chamber 30, the parent-isotope chamber 30 is sealed with a fill port stopper (not shown) to allow the natural decay of $^{224}$Ra to its intermediate isotope $^{220}$Rn which is in gaseous form. The parent-isotope chamber 30 does not have any headspace to ensure that the emanating gas is forced into the gas permeable membrane. In some embodiments, the parent-isotope dispenser 60 is configured to receive Nitrogen or Argon or other inert gas(es) into the parent-isotope dispenser 60, to displace any air in the headspace of the parent-isotope dispenser 60.

The gas permeable membrane 50 can define a gas permeable membrane chamber that allows the exchange of air and $^{220}$Rn gas from the parent-isotope chamber 30 to the daughter-isotope chamber 40. The gas permeable membrane chamber has a first surface facing the parent-isotope chamber 30 and a second surface facing the daughter-isotope chamber 40. The first surface facing the parent-isotope chamber is hydrophobic for maintaining the parent isotope in a liquid form within the parent-isotope chamber 30 and preventing any liquid exchange across the three chambers. The second surface facing the daughter-isotope chamber is also hydrophobic to prevent permeation of the $^{212}Pb$ daughter isotope from the daughter-isotope chamber 40 back to the parent-isotope chamber 30. Therefore, each liquid is physically retained respectively in the parent-isotope chamber 30 and in the daughter-isotope chamber 40 without contamination by the gas permeable membrane 50, and only gas, such as $^{220}Rn$, is allowed to pass from the parent-isotope chamber 30 to in the daughter-isotope chamber 40 through the gas permeable membrane 50. The gas permeable membrane 50 can comprise any kind of gas permeable membrane, including but not limited to screens or sintered powders, ceramic or plastic porous discs, microporous membranes, or lyophilized microspheres. The gas permeable membrane 50 is radiation hardened, for preventing damages to the membrane due to radiolysis of emitted alpha, beta and gamma particles generated by the emanation process.

The gas permeable membrane 50 can also be optimized to reduce any settling of contamination on the air exchange chamber so that the yield of the daughter isotopes can be maximized. In some embodiments, the air exchange chamber can comprise a recirculation air change path to force air exchange between the parent-isotope chamber 30 and the daughter-isotope chamber 40. Nitrogen, Argon and other inert gases could be used to force the movement of $^{220}Rn$ gas through the gas permeable membrane 50.

The daughter-isotope chamber 40 can be a gas tight chamber that is designed to optimize the collection of the emanated $^{220}Rn$ gas and allow the rapid decay to its daughter isotope that eventually leads to formulation of micro globule levels of $^{212}Pb$ liquid on the surfaces of the daughter-isotope chamber. The $^{212}Pb$ liquid globules will then be flushed from the daughter-isotope chamber 40. In some embodiments, the daughter-isotope chamber can be filled with glass beads or quartz wool or glass wool, or other resin material such as DOWEX®, AmberLite®, BIO-RAD™ AGR 50W, BIO-RAD™ AGR MP-50, or the like, to slow down the fluid flow if needed. To increase the surface area for the daughter-isotope chamber 40 to maximize the yield of $^{212}Pb$ isotope, the daughter-isotope chamber walls can contain radiation hardened filter fibers for the purposes of degassing $^{220}Rn$ from any liquid, tangential flow filtration to increase $^{212}Pb$ yield.

The inlet port 42 and the outlet port 45 of the closed retainer assembly 20 are tubular ports extending from the closed retainer assembly 20. The inlet port 42 and the outlet port 45 are both openings in the daughter-isotope chamber 40 and spaced apart from each other to define a longitudinal flow path for the eluent. The inlet port 42 is in fluid communication with an eluent dispenser 70 and configured to deliver an eluent in the daughter-isotope chamber 40. Thereby eluting, into a liquid form, the $^{212}Pb$ daughter isotope generated in a gaseous form. The eluent can be 0.1 M hydrochloric acid (Hcl), Nitric acid, or any other suitable acid solution to capture the $^{212}Pb$ daughter isotope in an aqueous solution. In some embodiment, 20 ml HCl vials are used as eluent dispenser 70. The eluent dispenser 70 is placed upward from the inlet port 42, to promote the delivery of the eluent in the daughter-isotope chamber by gravity and to create a flow path of eluent in the daughter-isotope chamber. The delivery of the eluent into the inlet port 42 can be controlled by an eluent port stopper 92. The emanated $^{212}Pb$ gas is then completely captured by the eluent delivered in the daughter-isotope chamber by the inlet port 42 to form a $^{212}Pb$ eluate, and dragged by the eluent flow through the outlet port 45.

In some embodiments, the eluent dispenser 70 can further comprise a vent filtration unit 75. The vent filtration unit 75 is in fluid communication with the eluent dispenser 70 and can be used to introduce filtered air in the eluent dispenser 70, to promote further the delivery of the eluent in the daughter-isotope chamber. In yet another embodiment, the vent filtration unit 75 can be used to introduce a fixed amount of Nitrogen, Argon or other inert gases gas in the daughter-isotope chamber, to force the movement of $^{220}Rn$ gas through the gas permeable membrane 50.

The collection container 80, in fluid communication with the outlet port 45, is configured to collect the $^{212}Pb$ daughter-isotope which has been eluted in a liquid form from the daughter-isotope chamber 40 ($^{212}Pb$ eluate). The collection container is placed upward from the outlet port 45. In some embodiments, a 30 ml vial can be used as the collection container 80 (similar radio-pharmacy experience), but it is understood that the isotope generator 10 is scalable based on required $^{212}Pb$ daughter-isotope quantities to be generated, the $^{212}Pb$ daughter-isotope quantities ranging from 1 mCi to 500 mCi. The collection container size can be adapted based on the need. In some embodiments, the collection container is a stoppered and crimp sealed vial and free from cap or plug. In some embodiment, the collection container 80 is sealed with a collection port stopper 96.

In some embodiments, the isotope generator 10 can further comprises an eluent filter 85, located downstream of the outlet port 45 further, between the outlet port 45 and the collection container 80. This filter can be an in-line filter of 0.2 μm such as polytetrafluoroethylene (PTFE) filters. The eluent filter 85 is configured to filter the fluid resulting from an elution process and provide a high-purity $^{212}Pb$ daughter isotope, and provide elution added bioburden control. The eluent filter 85 is a bioburden filter but does not filter other possible radioactive contaminants.

In some embodiments, some capping elements can be associated respectively with the inlet port 42 and the outlet port 45. Each capping element is configurable between a sterilization position and an operational position. In the sterilization position, the corresponding ports are blocked, which allows the isotope generator to be sterilized. In the operational position, the corresponding ports are open, an emanation process naturally occurs and the $^{220}Rn$ flows from the parent-isotope chamber 30 through the gas permeable membrane 50 to the daughter-isotope chamber 40 and then decays into the $^{212}Pb$ daughter isotope where the $^{212}Pb$ daughter isotope is extracted by the eluent and carried to the collection container 80. In addition, the cap plugs 92, 94, 96 can further comprise a capping element associated with the load port 35. In some embodiments, the capping element associated with the load port 35 is a septum.

Once the parent isotope has been delivered into the parent-isotope chamber 30, the load port 35 can be sealed to avoid any contamination.

The capping elements can further comprise an eluent-cap plug 92 protecting the eluent dispenser 70 and a parent-isotope cap plug 94 protecting the parent-isotope dispenser 60, the cap plugs 92, 94 being removable to initiate the daughter isotope emanation process.

As detailed in FIGS. 4 and 5, the closed retainer assembly 20' can be a packed glass column. In such embodiment, the retainer assembly 20' includes a parent-isotope chamber 30 for receiving the parent isotope, a daughter-isotope chamber 40 for collecting the $^{212}Pb$ daughter isotope, and a gas permeable membrane 50 separating the parent-isotope chamber 30 from the daughter-isotope chamber 40, with the parent-isotope chamber 30 being provided on top of the daughter-isotope chamber 40, and the gas permeable membrane 50 extending horizontally and longitudinally between the chambers.

The closed retainer assembly 20' can be a custom-designed assembly having the shape of a rectangular prism or compartment/housing. For example, without being limitative, the rectangular compartment can have a width of about ¼" and a length of about 3", as an example only. In some embodiments, the closed retainer assembly can have any dimension with a ratio length/width of about 5 to 15, and preferably of about 12. Such ratio allows the gas permeable membrane 50 to have a surface significantly greater than the load port, which maximizes and promotes the daughter isotope generation. In such an embodiment, the load port 35 is located on top of the parent-isotope chamber 30, and substantially centered along a length of parent-isotope chamber 30. The inlet port 42 and the outlet port 45 are located at opposed lateral ends of the daughter-isotope chamber 40, such that collection of the daughter isotope can occur along the entire length of the daughter-isotope chamber.

The geometry of the retainer assembly 20' is such that the gas particles of $^{220}$Rn are migrating by gravity from the parent-isotope chamber 30, located upstream of the gas permeable membrane 50, to the daughter-isotope chamber 40, located downstream of the gas permeable membrane 50.

The gas permeable membrane 50 can correspond to a physical barrier which can serve to constrain the immobilized parent isotope but which is permeable to the gas phase intermediary. Example of such barriers include layers of open-porosity solids such as stainless steel (or other metal) screens or sintered powder, ceramic or plastic porous discs, microporous membranes, or lyophilized microspheres.

During elution, the eluent is delivered in the daughter-isotope chamber 40 via the inlet port 42 and then pulled through the long, narrow, lower daughter-isotope chamber 40, which can be filled with glass beads, quartz wool or glass wool, or other resin material such as DOWEX®, AmberLite®, BIO-RAD™ AG® 50W, BIO-RAD™ AGR MP-50, or the like, to slow down fluid flow.

Referring now to FIG. 6, the closed retainer assembly 20" can be a hydrophobic/gasphilic filter or Pall© filter. In such an embodiment, the retainer assembly 20" includes a parent-isotope chamber 30 for receiving the parent isotope, a daughter-isotope chamber 40 for collecting the $^{212}$Pb daughter isotope, and a gas permeable membrane 50 separating the parent-isotope chamber 30 from the daughter-isotope chamber 40. The gas permeable membrane 50 can be a 0.2 micron hydrophobic filter, made of polyvinylidene difluoride (PVDF) membrane with a significant surface (about 19.6 cm$^2$) relative to its thickness. The membrane must be resilient enough to support 50 kGy gamma or 3×30 minutes autoclave cycles (131C), and 15PSI bubble point construction.

The parent-isotope chamber 30 comprises a load port 35 located on top of the parent-isotope chamber 30, and substantially centered along a length of parent-isotope chamber 30, into which a small volume of concentrated liquid parent isotope such as $^{224}$Ra can be dispensed (for example, 0.25 mL), the liquid wetting the hydrophobic gas permeable membrane 50. The load port 35 is to be physically sealed after loading.

In some embodiments, the parent isotope can be delivered to the parent-isotope chamber 30 using a syringe mounted with a needle, followed by an air purge to clear the needle. The needle can be inserted in a parent isotope dispensing inlet 65. All exposed needles are then covered by needle covers. The isotope generator 10 loaded with the parent isotope is then placed into an autoclave for sterilizing. After sterilizing, the isotope generator is placed into the shielded housing for shipment.

The parent isotope ($^{224}$Ra for example), which is in a liquid form, is retained in the parent-isotope chamber 30 by the hydrophobic gas permeable membrane 50, the gas permeable membrane 50 allows the generated $^{220}$Rn in its gaseous form to diffuse into the daughter-isotope chamber 40 through the gas permeable membrane 50, the $^{220}$Rn then decays into $^{212}$Pb which forms as moisture droplets on the walls of the daughter-isotope chamber 40. After allowing sufficient build up time the $^{212}$Pb is rinsed off using the eluent such as HCl solution that is delivered from the eluent dispenser 70 and collected in the collection container 80.

In this embodiment, the inlet port 42 and the outlet port 45 are both located on a bottom of the daughter-isotope chamber 40 and spaced apart from each other. The eluent dispenser 70 is connected to the inlet port 42 and the collection container 80 is connected to the outlet port 45. The eluent is drawn through a barb fitting, filling the tiny head-space in the daughter-isotope chamber 40, dragging eluent loaded with $^{212}$Pb out via the outlet port 45, through the eluent filter 85 (which will keep the process slow and steady), and into the collection container 80.

Figure 7:
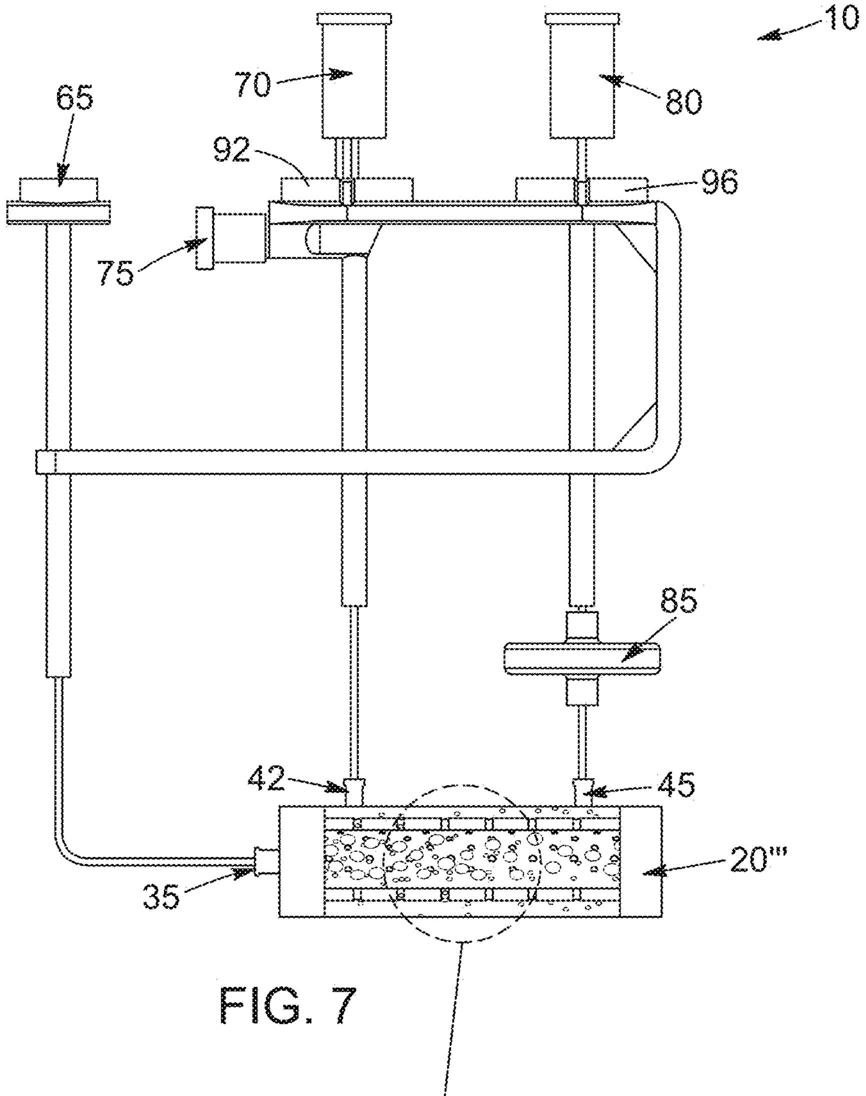
FIG. 7 is a cross-sectional side view of a terminally sterilized isotope generator for producing a $^{212}$Pb daughter isotope, in accordance with a third embodiment, wherein the closed retainer assembly is a tangential flow filter.

Referring now to FIG. 7, the closed retainer assembly 20" can be a tangential flow filter. In such embodiment, the retainer assembly 20" has a cylinder configuration and includes a parent-isotope chamber 30 for receiving the parent isotope, a daughter-isotope chamber 40 for collecting the $^{212}$Pb daughter isotope, and a gas permeable membrane 50 separating the parent-isotope chamber 30 from the daughter-isotope chamber 40. The parent-isotope chamber 30 is provided in a centered centred cylinder, the gas permeable membrane 50 extends on a peripheral surface of the centered centred cylinder of the parent-isotope chamber 30, and the daughter-isotope chamber 40 has an annular configuration extending circumferentially from the gas permeable membrane 50, the parent-isotope chamber 30, the gas permeable membrane 50 and the daughter-isotope chamber 40 being concentric.

The parent-isotope chamber 30 comprises a load port 35 located on a lateral side of the parent-isotope chamber 30, and substantially aligned with the center of the parent-isotope chamber 30.

In some embodiments, the parent isotope ($^{224}$Ra for example), which is in a liquid form, can be delivered to the parent-isotope chamber 30 using a syringe mounted with a needle, followed by an air purge to clear the needle. The needle can be inserted in a parent isotope dispensing inlet 65. All exposed needles are then covered by needle covers. The isotope generator 10 loaded with the parent isotope is then placed into an autoclave for sterilizing. After sterilizing, the isotope generator is placed into the shielded housing for shipment.

Figure 7A:
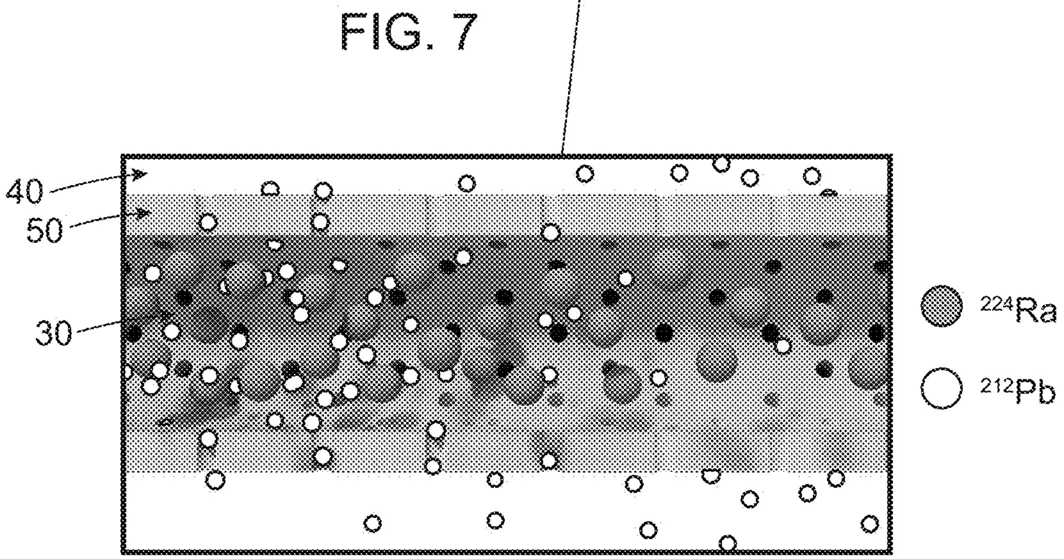
FIG. 7A is an enclosed cross-sectional side view of the closed retainer assembly of FIG. 7.

As shown in FIG. 7A, the parent isotope is retained in the parent-isotope chamber 30 by the hydrophobic gas permeable membrane 50, the gas permeable membrane 50 allows the generated $^{220}$Rn in its gaseous form to diffuse into the daughter-isotope chamber 40 formed by the area surrounding the gas permeable membrane 50, the $^{220}$Rn then decays into $^{212}$Pb which forms as moisture droplets on the walls of the daughter-isotope chamber 40. In this embodiment, the inlet port 42 and the outlet port 45 are both located on a top of the daughter-isotope chamber 40 and spaced apart from each other. The eluent dispenser 70 is connected to the inlet port 42 and the collection container 80 is connected to the outlet port 45. After allowing sufficient build up time, the $^{212}$Pb is rinsed off using the eluent such as HCl solution that is delivered from the eluent dispenser 70, circulating through the annular configuration of the daughter-isotope chamber 40, and collected in the collection container 80.

The present description also discloses a method for producing terminally sterilized pure alpha-emitting daughter isotope. The method comprises the steps of:

delivering the parent isotope into the parent-isotope chamber 30 of the closed retainer assembly 20 for initiating a $^{220}$Rn emanation process by natural decay of the parent isotope in the parent-isotope chamber 30;

- transferring the $^{220}$Rn in a gaseous form into a daughter-isotope chamber, through a gas permeable membrane 50 separating the parent-isotope chamber 30 and the daughter-isotope chamber 40, the gas permeable membrane 50 allowing the $^{220}$Rn to passively pass therethrough under the action of gravity or diffusion;
- generating a $^{212}$Pb daughter isotope by natural decay of $^{220}$Rn in the daughter-isotope chamber 40;
- circulating an eluent in the daughter-isotope chamber 40, to elute the $^{212}$Pb daughter isotope generated in a gaseous form;
- collecting the $^{212}$Pb daughter isotope eluted in a liquid form from the daughter-isotope chamber 40 into a collection container 80; and
- sealing the collection container filled of the $^{212}$Pb daughter isotope with a daughter isotope cap plug 96, to ensure sterilized collection container and maintain closed collection container integrity.

It is understood that the closed retainer assembly 20 used in this method can be any one of the three different embodiments as described above, namely the packed glass column 20' with glass beads, or the hydrophobic/gasphilic filter 20", or the tangential flow filter (TFF) 20'".

In some embodiments, the step of delivering the parent isotope can further comprise opening a parent-isotope cap plug 94.

In some embodiments, the step of circulating an eluent in the daughter-isotope chamber further comprises:

- removing an eluent-cap plug 92 protecting the eluent dispenser 70;
- injecting the eluent in an inlet port 42 of the daughter-isotope chamber 40 by the action of gravity, the eluent dispenser 70 being upstream of the inlet port 42; and
- ejecting the eluent in an outlet port 45, the outlet port 45 being located at opposed lateral end of the daughter-isotope chamber 40 from the inlet port 42.

In some embodiments, the step of collecting the $^{212}$Pb daughter isotope further comprises opening the daughter-isotope cap plug 96.

Vortex Configuration

Figure 8:
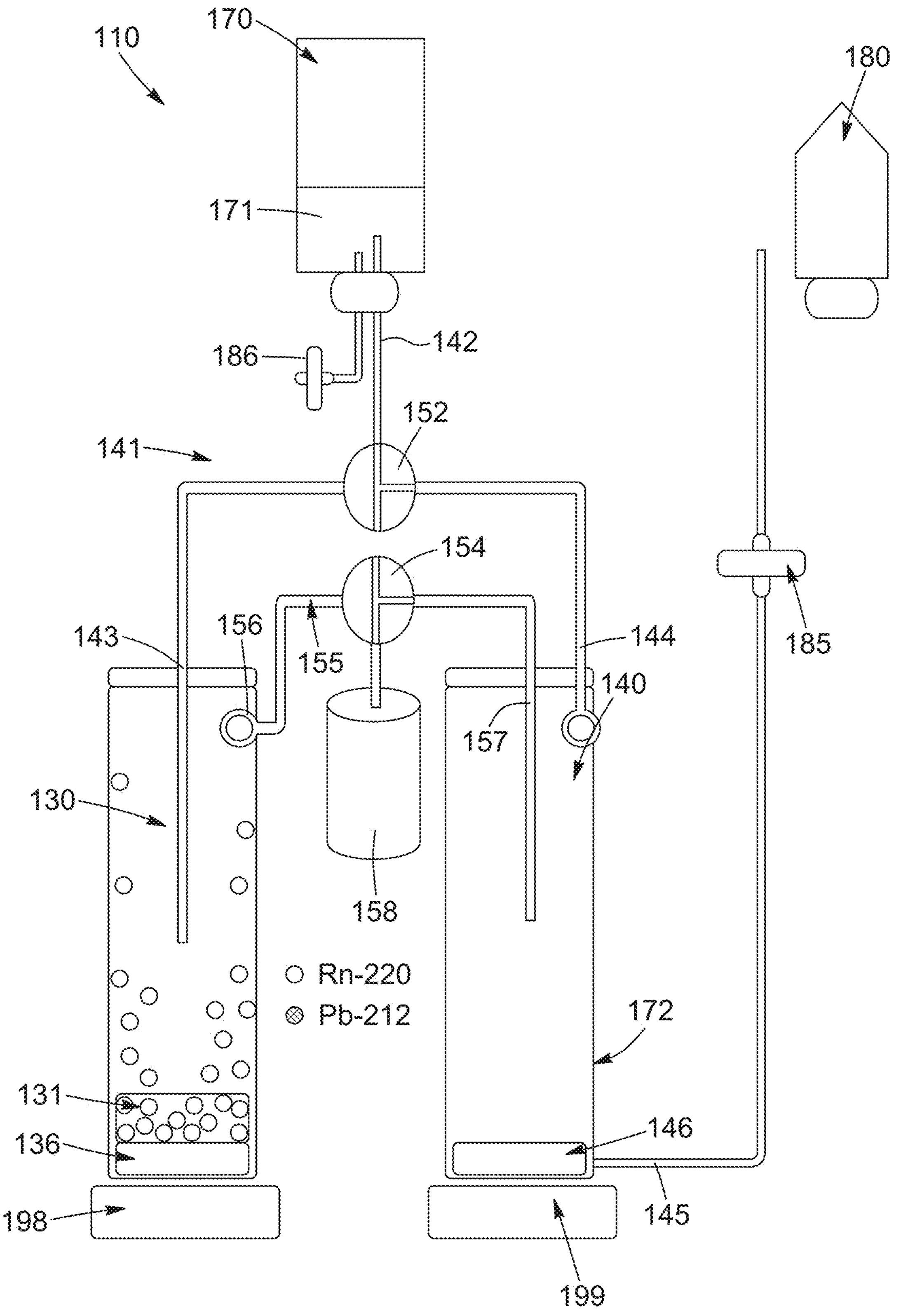
FIGS. 8 to 10 are a cross-sectional side views of a terminally sterilized isotope generator for producing a $^{212}$Pb daughter isotope, in accordance with a second configuration, wherein the $^{212}$Pb daughter isotope is generated by a vortex, with FIG. 8 showing a step of filling with an eluent, FIG. 9 showing a step of liberate and mix the daughter isotope, and FIG. 10 showing a step of eluting the daughter isotope.
Figure 9:
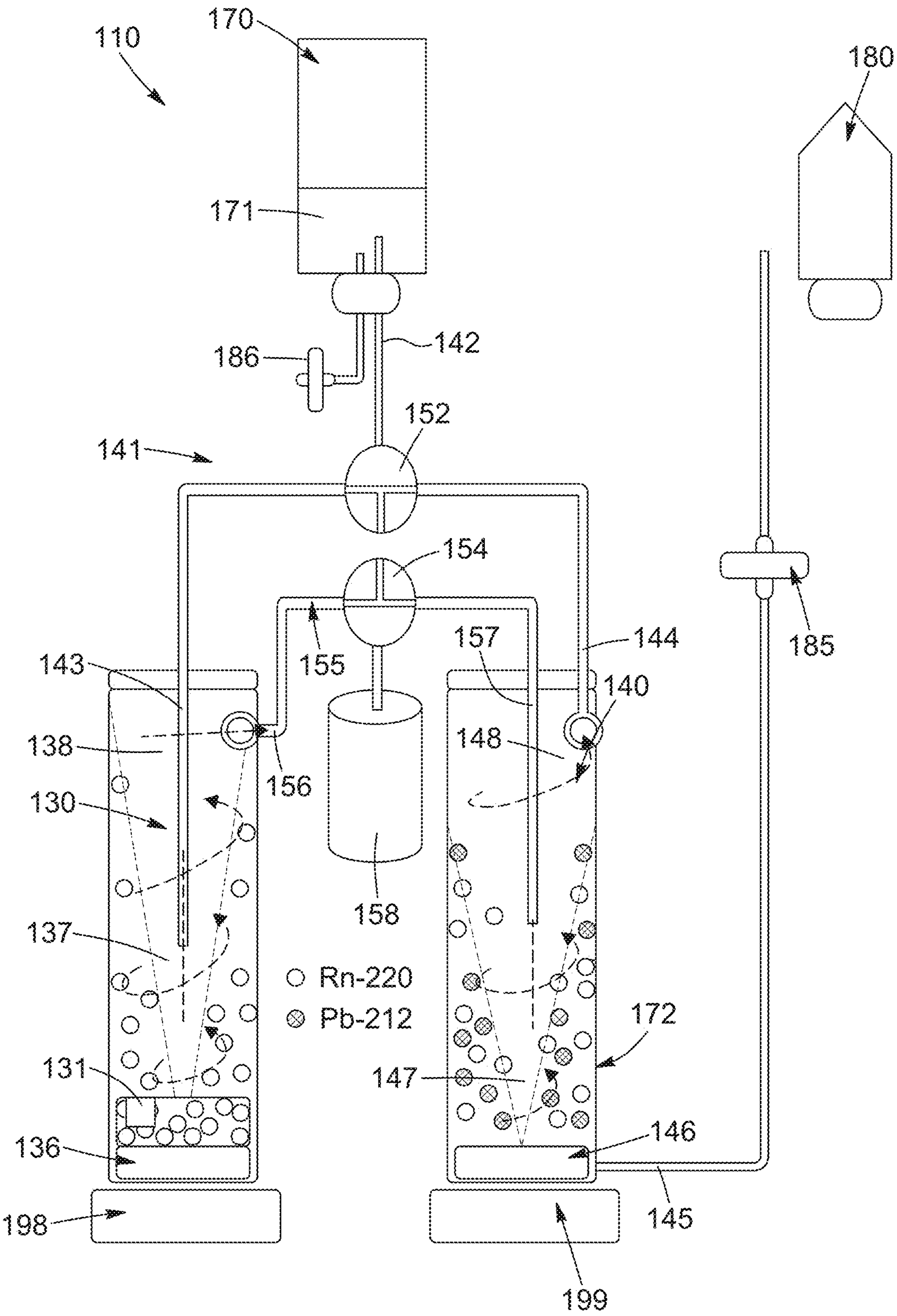
Figure 10:
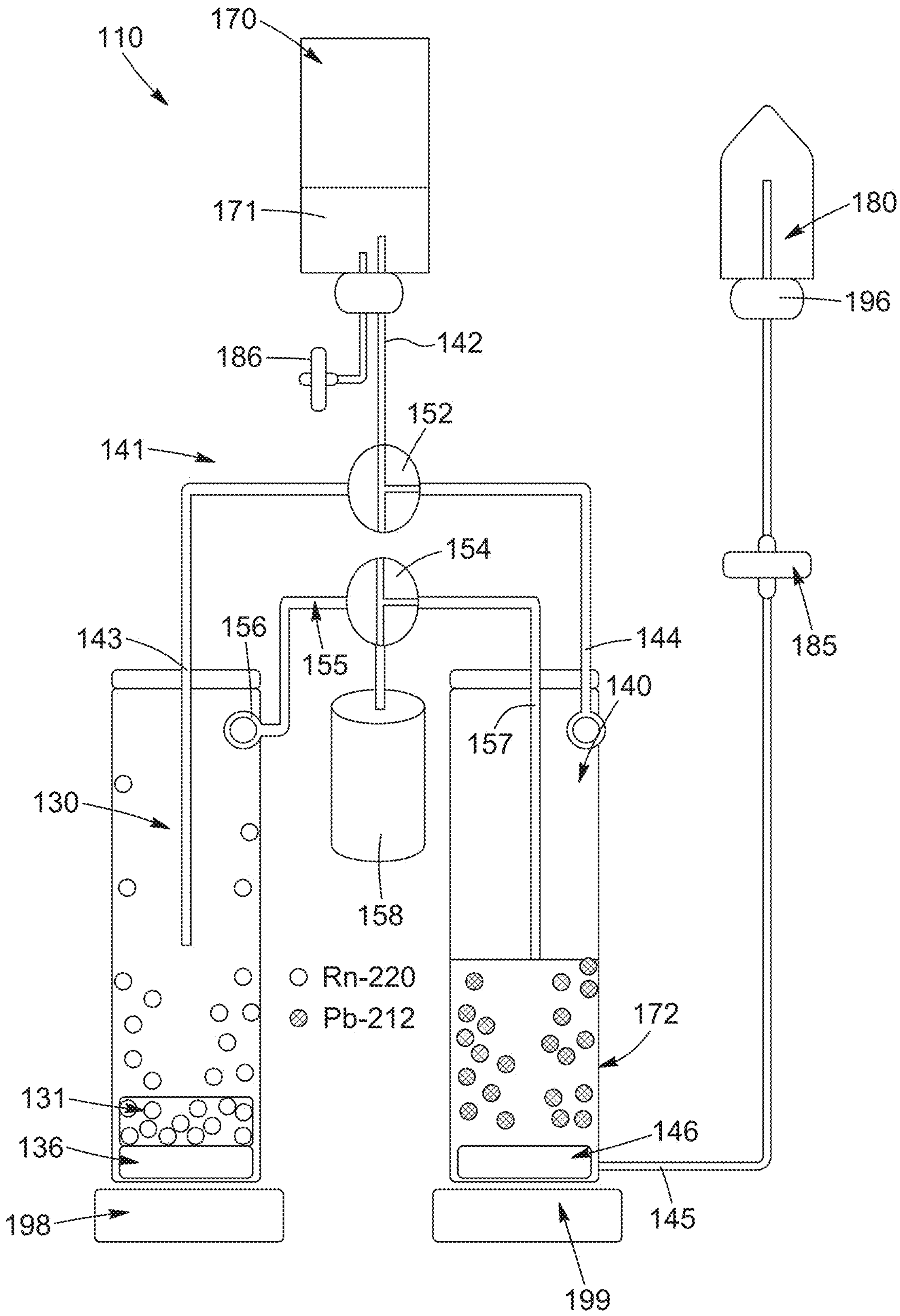

Referring now to FIGS. 8 to 10, there is shown another possible configuration of the isotope generator wherein the features are numbered with reference numerals in the 100 series which correspond to the reference numerals of the previous embodiments. Several components of the isotope generator 110 are similar to the isotope generator 10 and will not be described in further details.

In this embodiment, a terminally sterilized isotope generator 110 for producing a $^{212}$Pb daughter isotope by emanation of $^{220}$Rn gas from $^{224}$Ra is described.

The isotope generator 110 comprises a parent-isotope chamber 130, a daughter-isotope chamber 140, a controllable gas duct 155, an eluent dispenser 170, a controllable eluent duct 141 and a collection container 180. The controllable gas and eluent ducts can be collectively referred to as a "duct" or "tube" assembly.

In such embodiment, the parent-isotope chamber 130 can be divided into a lower zone 131 initially loaded with $^{224}$Ra onto a sponge or glass wool and dried and an upper zone 138 extending above the lower zone. The lower zone and the upper zone are in fluid communication with each other. The parent-isotope chamber 130 has a gas outlet port 156 in the upper zone 138. The parent isotope can be $^{224}$Ra, in either aqueous form or solid form, but it is understood that others parent isotopes can be used, such as $^{228}$Th, which will spontaneously decay into $^{224}$Ra in the parent-isotope chamber 30.

The daughter-isotope chamber 140 is configured to collect the $^{212}$Pb daughter isotope. The daughter-isotope chamber 140 has a gas inlet port 157 in an upper zone 148 of the daughter-isotope chamber 140.

The controllable gas duct 155 is connected between the gas outlet port 156 and the gas inlet port 157 and further comprises a gas duct selector 154. The controllable gas duct 155 is configurable between an open configuration fluidly connecting the gas outlet port 156 of the parent-isotope chamber 130 to the gas inlet port 157 of the daughter-isotope chamber 140, where the gas duct selector 154 is in an horizontal position, as shown in FIG. 9, and a closed configuration fluidly isolating the gas outlet port 156 of the parent-isotope chamber 130 from the gas inlet port 157 of the daughter-isotope chamber, where the gas duct selector 154 is in a vertical position, as shown in FIGS. 8 and 10.

In some embodiments, the controllable gas duct 155 can further comprises a safety reservoir 158. When the controllable gas duct is in the closed configuration with the gas duct selector 154 is in a vertical position (FIG. 8), the safety reservoir 158 is in fluid communication with the gas inlet port 157 of the daughter-isotope chamber 140, to absorb any pressure excess that can be generated in the daughter-isotope chamber 140.

The controllable eluent duct 141 has three ends:

- a first end 142 in fluid communication with the eluent dispenser 170 to receive the eluent;
- a second end 143 in fluid communication with the parent-isotope chamber 130; and
- a third end 144 in fluid communication with the daughter-isotope chamber 140.

The controllable eluent duct 141 further comprises an eluent duct selector 152.

The controllable eluent duct 141 is configurable between a loading configuration fluidly connecting the first end 142 to the third end 144 to fill the daughter-isotope chamber 140 with the eluent where the eluent duct selector 152 is in a vertical position, as shown in FIG. 8 and to elute in a liquid form the $^{212}$Pb daughter isotope generated in a gaseous form as shown in FIG. 10, and a mix configuration fluidly connecting the second end 143 to the third end 144 to allow remaining $^{220}$Rn to circulate from the daughter-isotope chamber 140 to the parent-isotope chamber 130 where the eluent duct selector 152 is in an horizontal position, as shown in FIG. 9.

The collection container 180 is in fluid communication with an outlet port 145 located in a lower zone of the daughter-isotope chamber, and is configured to collect the $^{212}$Pb daughter-isotope eluted in a liquid form from the daughter-isotope chamber 140.

The parent-isotope chamber 130 further comprises a first actuator 136 for creating a vortex 137. When the first actuator is actuated, the vortex initiates the generation of $^{220}Rn$ in a gaseous form, the $^{220}Rn$ naturally decaying from $^{224}Ra$. The higher pressure created by the vortex in the upper zone 138 of the parent-isotope chamber forces the $^{220}Rn$ in a gaseous form to circulate in the upper zone 138 of the parent-isotope chamber through the gas outlet port 156, to the controllable gas duct 155 in the open configuration, to the gas inlet port 157, and then to the daughter-isotope chamber 140, as shown in FIG. 9. After a period of time, the parent-isotope chamber 130 is sealed off from the daughter-isotope chamber 140 by positioning the gas duct selector 154 in the vertical position, and the first actuator 136 is turned off (FIG. 10).

The daughter-isotope chamber 140 further comprises a second actuator 146 for creating a vortex. The second actuator 146 is only actuated in the last phase of the process (FIG. 10), once the first actuator 136 has been turned off. When the second actuator 146 is actuated and the controllable gas duct is in the closed configuration, i.e., the gas duct selector 154 is in the vertical position (see FIG. 10), the vortex initiates the generation of $^{212}Pb$ in a gaseous form, the $^{212}Pb$ naturally decaying from $^{220}Rn$. The eluent dispenser 170 is placed upward from the daughter-isotope chamber 140, to promote the delivery of the eluent 171 in the daughter-isotope chamber by gravity and to create a flow path of eluent in the daughter-isotope chamber 140. The delivery of the eluent into the third end 144 can be controlled by the eluent duct selector 152 (then positioned in the vertical position for delivery of the eluent 171).

In some embodiments, the eluent dispenser 170 can further comprise a vent filtration unit 186. The vent filtration unit 186 is in fluid communication with the eluent dispenser 170 and can be used to introduce filtered air in the eluent dispenser 170, to promote further the delivery of the eluent in the daughter-isotope chamber 140.

The $^{212}Pb$ in a gaseous form in the daughter-isotope chamber 140 is extracted by the eluent, washed off of the walls of the daughter-isotope chamber 140 to form the $^{212}Pb$ eluate 172. The $^{212}Pb$ eluate 172 is then carried to the collection container 180 through the outlet port 145.

In some embodiments, the isotope generator 110 can further comprises an eluent filter 185, located downstream of the outlet port 145 further, between the outlet port 145 and the collection container 180. This filter can be an in-line filter of 0.2 μm such as polytetrafluoroethylene (PTFE) filters. The eluent filter 185 is configured to filter the fluid resulting from an elution process and provide a high-purity $^{212}Pb$ daughter isotope, and provide elution added bioburden control. The eluent filter 185 is a bioburden filter but does not filter other possible radioactive contaminants.

The isotope generator 110 is also scalable based on a required $^{212}Pb$ daughter-isotope quantities to be generated, the $^{212}Pb$ daughter-isotope quantities range from 1 mCi to 500 mCi.

The first and second actuators 136, 146 for creating a vortex can comprise a stir pellet or bar located in a bottom of the parent-isotope chamber 130 and the daughter-isotope chamber 140, respectively, and activated by a magnetic stir plate 198, 199 located outside and below the parent-isotope chamber 130 and the daughter-isotope chamber 140, respectively. When the magnetic stir plate 198, 199 is activated, the stir pellet or bar is engaged in a rotation. It is understood though that any other actuators can be used to generate a vortex, such as a rotative arm.

The present description also discloses an alternative method for producing terminally sterilized pure alpha-emitting daughter isotope. The method comprises the steps of:

providing a parent-isotope chamber 130 loaded with a parent isotope for initiating a $^{220}Rn$ emanation process by natural decay of the parent isotope in the parent-isotope chamber 130;

initiating a vortex in the parent-isotope chamber 130 to initiate a movement of $^{220}Rn$ particles upstream;

transferring the $^{220}Rn$ in a gaseous form into a daughter-isotope chamber 140, through a controllable gas duct 155 connecting the parent-isotope chamber 130 to the daughter-isotope chamber 140, the controllable gas duct 155 configured in an open configuration allowing the $^{220}Rn$ to passively pass therethrough;

generating a $^{212}Pb$ daughter isotope by natural decay of $^{220}Rn$ in the daughter-isotope chamber 140;

circulating an eluent 171 in the daughter-isotope chamber 140, to elute the $^{212}Pb$ daughter isotope generated in a gaseous form;

collecting the $^{212}Pb$ daughter isotope eluted in a liquid form from the daughter-isotope chamber 140 into a collection container 180; and sealing the collection container filled of the $^{212}Pb$ daughter isotope with a daughter isotope cap plug 196, to ensure sterilized collection container and maintain closed collection container integrity.

Several alternative embodiments and examples have been described and illustrated herein. The embodiments described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the system described herein may be embodied in other specific forms without departing from the central characteristics thereof. The present examples and embodiments, therefore, are to be considered in all respects as illustrative and not restrictive, and the system and method is not to be limited to the details given herein. Accordingly, while the specific embodiments have been illustrated and described, numerous modifications come to mind. The scope of the system and method is therefore intended to be limited solely by the scope of the appended claims.

The invention claimed is:

1. An isotope generator for producing a Lead-212 ($^{212}Pb$) daughter isotope by emanation of Radon-220 ($^{220}Rn$) gas from a parent isotope, the isotope generator comprising:

a closed retainer assembly comprising:

a parent-isotope chamber for receiving a quantity of the parent isotope, a daughter-isotope chamber for collecting a quantity of the $^{212}Pb$ daughter isotope, and a gas permeable membrane separating the parent-isotope chamber from the daughter-isotope chamber, wherein the parent-isotope chamber is configured to enable the quantity of the parent isotope to naturally decay into a quantity of $^{220}Rn$ within the parent-isotope chamber, and wherein the gas permeable membrane is configured to enable the quantity of $^{220}Rn$ to pass therethrough, wherein the daughter-isotope chamber is configured to enable the quantity of $^{220}Rn$ to spontaneously decay into a quantity of $^{212}Pb$ in gaseous form within the daughter-isotope chamber;

a load port that opens in the parent-isotope chamber, an inlet port and an outlet port, spaced apart from each other, and both opening in the daughter-isotope chamber, a parent-isotope dispenser, in fluid communication with the load port, configured to deliver the parent isotope into the parent-isotope chamber;

an eluent dispenser, in fluid communication with the inlet port, configured to deliver an eluent in the daughter-isotope chamber, to elute in a liquid form at least a portion of the quantity of the $^{212}Pb$ daughter isotope in gaseous form;

a collection container, in fluid communication with the outlet port, configured to collect a $^{212}Pb$ eluate corresponding to said at least a portion of the quantity of the $^{212}Pb$ daughter isotope eluted in a liquid form from the daughter-isotope chamber; and capping elements, respectively associated with the inlet port and the outlet port, each capping element being configurable between a sterilization position and an operational position, wherein in the sterilization position, the corresponding ports are blocked, and in the operational position, the corresponding ports are open, whereby an emanation process naturally occurs and the quantity of the $^{220}Rn$ flows from the parent-isotope chamber through the gas permeable membrane to the daughter-isotope chamber, and then decays into the quantity of $^{212}Pb$ daughter isotope, where said at least a portion of the quantity of the $^{212}Pb$ daughter isotope is extracted by the eluent and carried to the collection container.

2. The isotope generator of claim 1, wherein the isotope generator is configured to produce the quantity of $^{212}Pb$ daughter isotope by emanation of $^{220}Rn$ gas from the parent isotope without recourse to external utilities.

3. The isotope generator of claim 1, further comprising:

a septum associated with the load port;

an eluent-cap plug protecting the eluent dispenser; and a parent-isotope cap plug protecting the parent-isotope dispenser, wherein the eluent-cap plug and the parent-isotope cap plug are configured to be removable, wherein removal of both the eluent-cap plug and the parent isotope cap plug allows the isotope generator to initiate a daughter isotope emanation process.

4. The isotope generator of claim 1, wherein the isotope generator is configured to enable the quantity of the $^{220}Rn$ in its gaseous form to be separated from the parent isotope by its passage through the gas permeable membrane without recourse to external utilities.

5. The isotope generator of claim 1, wherein a first surface of the gas permeable membrane facing the parent-isotope chamber is hydrophobic to maintain the parent isotope in a liquid form, and wherein a second surface of the gas permeable membrane facing the daughter-isotope chamber is hydrophobic to prevent permeation of the quantity of $^{212}Pb$ daughter isotope from the parent-isotope chamber back to the daughter-isotope chamber.

6. The isotope generator of claim 1, wherein the gas permeable membrane is radiation hardened to prevent damage, to the gas permeable membrane due to radiolysis of emitted alpha, beta and gamma particles generated by the emanation process.

7. The isotope generator of claim 1, wherein the gas permeable membrane defines an exchange chamber between a first surface facing the parent-isotope chamber and a second surface facing the daughter-isotope chamber, and wherein the exchange chamber comprises an air path to facilitate air flow between the parent-isotope chamber and the daughter-isotope chamber.

8. The isotope generator of claim 1, further comprising the quantity of the parent isotope disposed in the parent-isotope chamber, wherein the parent isotope is Radium-224 ($^{224}Ra$), in either aqueous form or solid form.

9. The isotope generator of claim 1, further comprising the quantity of the parent isotope disposed in the parent-isotope chamber, wherein the parent isotope is Thorium-228 ($^{228}Th$).

10. The isotope generator of claim 1, wherein further comprising the $^{212}Pb$ eluate collected in the collection container.

11. The isotope generator of claim 1, further comprising an eluent in the eluent dispenser, wherein the eluent is an acid solution that is suitable to capture the $^{212}Pb$ daughter isotope in an aqueous solution.

12. The isotope generator of claim 1, further comprising an eluent filter located downstream of the outlet port, to filter an eluate fluid resulting from an elution process and to decrease bioburden in the fluid.

13. The isotope generator of claim 1, wherein the isotope generator is self-contained in a radiation shielded housing, and wherein the radiation shielded housing is transportable and provides adequate radiation shielding protection during a transportation process.

14. The isotope generator of claim 1, wherein the parent-isotope chamber is filled with glass beads, or quartz wool, or glass wool, or a resin material, or a radiation-hardened substrate, for tagging of the parent isotope thereon.

15. The isotope generator of claim 14, wherein the radiation-hardened substrate is any one of barium-stearate, zirconium chloride, or other acid-activated substrate(s).

16. The isotope generator of claim 1, wherein the quantity of the parent isotope is up to 500 mCi.

17. An isotope generator for producing a $^{212}Pb$ daughter isotope by emanation of Radon-220 ($^{220}Rn$) gas from a parent isotope, the isotope generator comprising:

a parent-isotope chamber, divided into a lower zone initially loaded with a quantity of the parent isotope onto a substrate supporting the emanation of $^{220}Rn$, and an upper zone extending above the lower zone, the lower zone and the upper zone being in fluid communication with each other, the parent-isotope chamber having a gas outlet port in the upper zone;

a daughter-isotope chamber for collecting a quantity of $^{212}Pb$ daughter isotope, the daughter-isotope chamber having a gas inlet port in an upper zone of the daughter-isotope chamber;

a controllable gas duct, connected between the gas outlet port and the gas inlet port, the controllable gas duct being configurable between an open configuration fluidly connecting the gas outlet port of the parent-isotope chamber to the gas inlet port of the daughter-isotope chamber, and a closed configuration fluidly isolating the gas outlet port of the parent-isotope chamber from the gas inlet port of the daughter-isotope chamber;

an eluent dispenser, configured to deliver an eluent;

a controllable eluent duct having three ends comprising:

a first end in fluid communication with the eluent dispenser to receive the eluent;

a second end in fluid communication with the parent-isotope chamber; and a third end in fluid communication with the daughter-isotope chamber, wherein the controllable eluent duct is configurable between a loading configuration fluidly connecting the first end to the third end and a mixing configuration fluidly connecting the second end to the third end, wherein the loading configuration allows filling of fill the daughter-isotope chamber with the eluent and allows elution, in a liquid form, the quantity of $^{212}Pb$ daughter isotope generated in a gaseous form from the daughter-isotope chamber, and wherein the mix configuration allows a quantity of $^{220}Rn$ to circulate from the daughter-isotope chamber to the parent-isotope chamber; and a collection container, in fluid communication with an outlet port located in a lower zone of the daughter-isotope chamber, configured to collect the quantity of $^{212}Pb$ daughter isotope eluted in a liquid form from the daughter-isotope chamber, wherein the parent-isotope chamber further comprises a first actuator configured for creating, in response to being actuated and the controllable gas duct being in the open position, gas movement in the parent-isotope chamber, wherein the gas movement in the parent-isotope initiates generation of a quantity of $^{220}Rn$ in a gaseous form from natural decay of, $^{224}Ra$, and forces the quantity of $^{220}Rn$ in the gaseous form to circulate in the upper zone of the parent-isotope chamber through the gas outlet port, to the controllable gas duct, to the gas inlet port, and then to the daughter-isotope chamber;

wherein the daughter-isotope chamber further comprises a second actuator configured for creating, in response to being actuated and the controllable gas duct being in the closed configuration, gas movement in the daughter-isotope chamber wherein the gas movement in the daughter-isotope chamber initiates a generation of a quantity of $^{212}Pb$ in a gaseous form, the quantity of $^{212}Pb$ naturally decaying from $^{220}Rn$, where at least a portion of the quantity of $^{212}Pb$ in the gaseous form is extracted by the eluent and carried to the collection container through the outlet port.

18. The isotope generator of claim 17, wherein the first actuator comprises:

a first stir pellet or a first bar located in a bottom of the parent-isotope chamber, and a first magnetic stir plate located outside and below the parent-isotope, wherein when the first magnetic stir plate is activated, the first stir pellet or first the bar is engaged in a rotation; and wherein the second actuator comprises:

a second stir pellet or a second bar located in a bottom the daughter-isotope chamber, and a second magnetic stir plate located outside and below the daughter-isotope chamber, wherein when the second magnetic stir plate is activated, the second stir pellet or second the bar is engaged in a rotation.

19. The isotope generator of claim 17, wherein the parent-isotope chamber is filled with a hydrogel compound for absorbing $^{224}Ra$, and wherein the daughter-isotope chamber is filled with glass beads, quartz wool, glass wool, a resin material, or a radiation-hardened substrate.

20. The isotope generator of claim 17, wherein the daughter-isotope chamber further comprises radiation hardened filter fibers that enable tangential flow filtration.

21. The isotope generator of claim 17, wherein the quantity of the parent isotope is up to 500 mCi.

22. A method for producing alpha-emitting daughter isotope, comprising the steps of:

delivering a quantity of a parent isotope into a parent-isotope chamber of a closed retainer assembly, wherein a quantity of $^{220}Rn$ in gaseous form is produced in the parent-isotope chamber by natural decay of the parent isotope in the parent-isotope chamber;

enabling the quantity of the $^{220}Rn$ in gaseous form to pass through a gas permeable membrane separating the parent-isotope chamber and a daughter-isotope chamber to transfer the quantity of $^{220}Rn$ into the daughter-isotope chamber, wherein the quantity of $^{220}Rn$ passes through the gas permeable membrane;

enabling at least a portion of the quantity of $^{220}Rn$ to decay in the daughter-isotope chamber to generate a quantity of $^{212}Pb$ daughter isotope in a gaseous form in the daughter-isotope chamber;

delivering at least a portion of the quantity of $^{212}Pb$ daughter isotope generated in gaseous form out of the daughter-isotope chamber and into a collection chamber; and sealing, after said delivering at least a portion of the quantity of $^{212}Pb$ daughter isotope, the collection container with a daughter isotope cap plug.

23. The method of claim 22, wherein the wherein the quantity of $^{220}Rn$ passes through the gas permeable membrane under action of gravity or diffusion.

* * * * *